US008902951B2

(12) United States Patent
Ma et al.

(10) Patent No.: US 8,902,951 B2
(45) Date of Patent: Dec. 2, 2014

(54) METHODS AND SYSTEMS FOR OFDM USING CODE DIVISION MULTIPLEXING

(71) Applicant: Apple Inc., Cupertino, CA (US)

(72) Inventors: Jianglei Ma, Kanata (CA); Ming Jia, Ottawa (CA); Wen Tong, Ottawa (CA); Peiying Zhu, Kanata (CA); Hua Xu, Ottawa (CA); Hang Zhang, Nepean (CA); Mo-Han Fong, L'Orignal (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/944,065

(22) Filed: Jul. 17, 2013

(65) Prior Publication Data

US 2013/0301685 A1   Nov. 14, 2013

Related U.S. Application Data

(63) Continuation of application No. 13/333,463, filed on Dec. 21, 2011, which is a continuation of application No. 11/910,091, filed as application No. PCT/CA2006/000523 on Mar. 30, 2006, now Pat. No. 8,111,763.

(60) Provisional application No. 60/759,461, filed on Jan. 17, 2006, provisional application No. 60/666,548, filed on Mar. 30, 2005.

(51) Int. Cl.
*H04B 1/00* (2006.01)
(52) U.S. Cl.
USPC .......................................................... 375/147
(58) Field of Classification Search
USPC ......... 375/130, 150, 259–260, 265–267, 295, 375/299; 370/335, 337, 342, 347, 479, 491, 370/498, 503, 509
See application file for complete search history.

(56) References Cited

U.S. PATENT DOCUMENTS

| 6,904,283 B2 | 6/2005 | Li et al. |
| 6,940,827 B2 | 9/2005 | Li et al. |
| 7,242,722 B2 | 7/2007 | Krauss et al. |

(Continued)

FOREIGN PATENT DOCUMENTS

| CA | 2537534 | 3/2005 |

OTHER PUBLICATIONS

Kaiser, "OFDM Code-Divisional Multiplexing in Fading Channels", Communications IEEE Transactions, Aug. 2002, pp. 1266-1273.

(Continued)

*Primary Examiner* — Khanh C Tran
(74) *Attorney, Agent, or Firm* — Paradigm IP Law, PC; Ross L. Franks

(57) ABSTRACT

In some embodiments of the invention, OFDM symbols are transmitted as a plurality of clusters. A cluster includes a plurality of OFDM sub-carriers in frequency, over a plurality of OFDM symbol durations in time. Each cluster includes data as well as pilot information as a reference signal for channel estimation. In some embodiments, a plurality of clusters collectively occupy the available sub-carrier set in the frequency domain that is used for transmission. In some embodiments of the invention data and/or pilots are spread within each cluster using code division multiplexing (CDM). In some embodiments pilots and data are separated by distributing data on a particular number of the plurality of OFDM symbol durations and pilots on a remainder of the OFDM symbol durations. CDM spreading can be performed in time and/or frequency directions.

5 Claims, 17 Drawing Sheets

(56) References Cited

U.S. PATENT DOCUMENTS

| | | | |
|---|---|---|---|
| 7,280,467 | B2 | 10/2007 | Smee et al. |
| 7,379,742 | B2 * | 5/2008 | Li et al. ................ 455/452.1 |
| 7,436,758 | B2 * | 10/2008 | Suh et al. ................ 370/203 |
| 7,974,178 | B2 | 7/2011 | Lomnitz et al. |
| 7,986,613 | B2 * | 7/2011 | Lomnitz ................ 370/208 |
| 8,031,642 | B2 * | 10/2011 | Cai et al. ................ 370/278 |
| 2002/0159422 | A1 | 10/2002 | Li et al. |
| 2004/0246998 | A1 | 12/2004 | Ma et al. |
| 2005/0063345 | A1 | 3/2005 | Wu et al. |
| 2007/0097927 | A1 * | 5/2007 | Gorokhov et al. ........ 370/335 |

OTHER PUBLICATIONS

Jankiraman, et al., "A Novel Solution to Wireless Multimedia Application: the Hybrid OFDM/CDM/SFH Approach", The 11th IEEE International Symposium on Personal, Indoor and Mobile Communication, 2000, vol. 2, pp. 1368-1374.

Yee, et al., "Multi-Carrier CDMA in INnoor Wireless Radio Networks", The 4th International Symposium on Personal, Indoor and Mobile Communications, Sep. 1993, pp. 108-114.

Extended Search Report in European Patent Application No. 06721728.1-1851 / 1867085, Apr. 18, 2013, pp. 1-9.

* cited by examiner

METHODS AND SYSTEMS FOR OFDM USING CODE DIVISION MULTIPLEXING

PRIORITY CLAIM

This application is a continuation of and claims the benefit of priority from U.S. patent application Ser. No. 13/333,463, entitled "Methods and Systems for OFDM using Code Division Multiplexing" and filed on Dec. 21, 2012, which is a continuation of and claims the benefit of priority from U.S. patent application Ser. No. 11/910,091, entitled "Methods and Systems for OFDM using Code Division Multiplexing" and filed on May 15, 2008 (issued as U.S. Pat. No. 8,111,763 on Feb. 7, 2012), which is a National Stage of and claims the benefit of priority from PCT/CA2006/000523, entitled "Methods and Systems for OFDM using Code Division Multiplexing" and filed on Mar. 30, 2006, which claims the benefit of priority from two (2) U.S. Provisional Patent Applications: No. 60/759,461, entitled "MIMO-OFDM Air Interface" and filed on Jan. 17, 2006, and No. 60/666,548, entitled "MIMO-OFDM Air Interface" and filed on Mar. 30, 2005, all of which are fully incorporated herein by reference for all purposes.

BACKGROUND

1. Field of the Application

The invention relates to the field of wireless communications, more specifically to systems and methods for supporting Orthogonal Frequency Division Multiplexed (OFDM) symbol transmission.

2. Background of the Disclosure

Orthogonal frequency division multiplexing (OFDM) is a form of multiplexing that distributes data over a number of carriers that have a very precise spacing in the frequency domain. The precise spacing of the carriers provides several benefits such as high spectral efficiency, resiliency to radio frequency interference and lower multi-path distortion. Due to its beneficial properties and superior performance in multi-path fading wireless channels, OFDM has been identified as a useful technique in the area of high data-rate wireless communication, for example wireless metropolitan area networks (MAN). Wireless MAN are networks to be implemented over an air interface for fixed, portable, and mobile broadband access systems.

SUMMARY

In a first broad aspect of the invention, there is provided a method of transmitting comprising: defining a first plurality of OFDM symbols to contain a plurality of clusters, each cluster comprising a plurality of sub-carriers over a plurality of OFDM symbol durations; spreading at least one of data and pilots within each cluster using code division multiplexing (CDM); transmitting the first plurality of OFDM symbols from a first transmit antenna.

In some embodiments a first sub-set of the OFDM symbol durations contain the pilots and a second sub-set of the OFDM symbol durations contain the data, the first sub-set being distinct from the second sub-set.

In some embodiments spreading at least one of data and pilots within each cluster using CDM comprises spreading only data in a time direction over multiple OFDM symbol durations or a frequency direction over multiple sub-carriers.

In some embodiments spreading at least one of data and pilots within each cluster using CDM comprises spreading only pilots in a time direction over multiple OFDM symbol durations or a frequency direction over multiple sub-carriers.

In some embodiments the method is performed simultaneously for at least two transmit antennas, each of the at least two transmit antenna being assigned a respective CDM spreading code.

In some embodiments the method further comprises: for each of a plurality of users, spreading the data for the user using a respective CDM code to produce a respective spread data; adding together the spread data for inclusion in the data locations of the plurality of OFDM symbols.

In some embodiments spreading data within each cluster comprises spreading data in a time direction over multiple OFDM symbols.

In some embodiments spreading data within each cluster comprises spreading data in a frequency direction over multiple sub-carriers.

In some embodiments the method further comprises for each of at least one additional antenna: defining a respective plurality of OFDM symbols to contain a plurality of clusters, each cluster comprising a plurality of sub-carriers over a plurality of OFDM symbol durations; spreading at least one of data and pilots within each cluster using a respective code division multiplexing (CDM) code; transmitting the respective plurality of OFDM symbols from the additional transmit antenna.

In some embodiments transmitting from the first antenna and the at least one additional antenna comprises transmitting from at least two transmitters each having at least one antenna.

In some embodiments transmitting from the first antenna and the at least one additional antenna comprises transmitting from one transmitter having the first antenna and the at least one additional antenna.

In some embodiments the method further comprises: for each antenna, assigning pilots in each sub-carrier of at least one OFDM symbol duration in each of the plurality of clusters and nulls in each sub-carrier of at least one other OFDM symbol duration in the plurality of clusters.

In some embodiments transmitting from the first antenna and the at least one additional antenna comprises transmitting from two antennas, the method further comprising: for the first transmit antenna, assigning pilots in each sub-carrier of at least one OFDM symbol duration in the plurality of clusters and assigning nulls in each sub-carrier of at least one other OFDM symbol duration in the plurality of clusters; and for the at least one additional antenna, inserting pilots in each sub-carrier of the at least one other OFDM symbol duration in the plurality of clusters and inserting nulls in each sub-carrier of the at least one OFDM symbol duration in the plurality of clusters.

In some embodiments transmitting from the first antenna and the at least one additional antenna comprises transmitting from two transmit antenna and the method further comprises: for the first antenna of the two transmit antennas, for repeating first and second clusters of the plurality of clusters assigning pilots in each sub-carrier of at least one OFDM symbol duration of the first cluster and assigning nulls in each sub-carrier of the at least one OFDM symbol duration of the second cluster; and for the at least one additional antenna of the two transmit antennas, for the repeating first and second clusters assigning pilots in each sub-carrier of at least one OFDM symbol duration of the second cluster and inserting nulls in each sub-carrier of the at least one OFDM symbol duration of the first cluster.

In some embodiments transmitting from the first antenna and the at least one additional antenna comprises transmitting from two transmit antenna, the method further comprising: for the first antenna of the two transmit antennas, for repeating first and second clusters of the plurality of clusters assigning pilots in each even numbered sub-carrier of at least one OFDM symbol duration of the first cluster and assigning nulls in each odd numbered sub-carrier of the at least one OFDM symbol duration of the second cluster; and for the at least one additional antenna of the two transmit antennas, for the repeating first and second clusters assigning pilots in each even numbered sub-carrier of at least one OFDM symbol duration of the second cluster and assigning nulls in each odd numbered sub-carrier of the at least one OFDM symbol duration of the first cluster.

In some embodiments a subset of the plurality of clusters provides an access channel comprising a particular number of sub-carriers over a particular number of OFDM symbol durations for communication between a mobile terminal and a base station.

In some embodiments the subset of the plurality of clusters that provides the access channel are mapped to locations that are spread out within the combined OFDM sub-carrier set of the plurality of clusters.

In some embodiments the plurality of clusters that provide the access channel are contiguous within the combined OFDM sub-carrier set of the plurality of clusters.

In some embodiments pilots and data share an OFDM sub-carrier set of the cluster in at least one OFDM symbol duration.

In some embodiments a plurality of pilot groups are arranged in each cluster, each pilot group comprising multiple pilot locations, and wherein and pilots are spread across pilot locations within each pilot group.

In some embodiments the method is performed for at least one user, each of the at least one user being assigned a respective CDM spreading code.

In some embodiments the plurality of pilot locations in each pilot group are localized in close proximity and the pilot groups are distributed within the cluster.

In some embodiments the pilot locations in each pilot group are contiguous in at least one of time and frequency.

In some embodiments the plurality pilot locations in each group are scattered within the cluster.

In some embodiments there is provided a transmitter adapted to perform the methods of any of the above embodiments.

In some embodiments there is provided a receiver adapted to receive a signal transmitted in accordance with any of the above embodiments.

In some embodiments the receiver is further adapted to extract pilots from the signal and to perform channel estimation by interpolating in time and/or frequency directions.

In some embodiments the receiver is further adapted to perform channel estimation by averaging pilots.

In some embodiments the receiver is further adapted to despread at least one of pilots and data using at least one CDM spreading code assigned to the receiver.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION

OFDM symbol transmission schemes are provided by embodiments of the invention in which user content is code division modulated prior to OFDM modulation.

In some embodiments of the invention, OFDM symbols are transmitted as a plurality of clusters. A cluster includes a plurality of OFDM sub-carriers in frequency, over a plurality of OFDM symbol durations in time. Each cluster includes data as well as pilot information as a reference signal for channel estimation. In some embodiments, a plurality of clusters collectively occupy the available sub-carrier set in the frequency domain that is used for transmission.

Figure 6A:
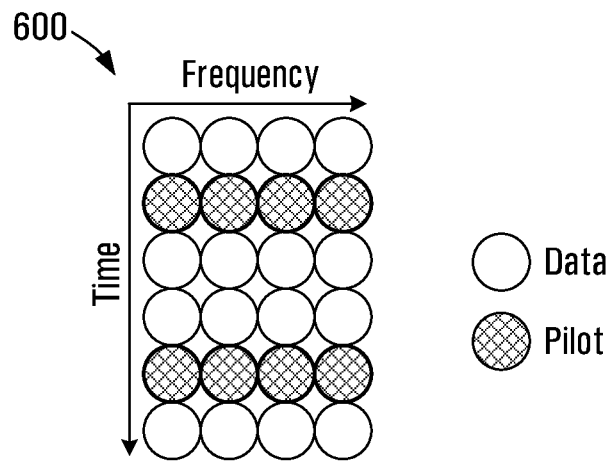
FIG. 6A is a schematic diagram of an example cluster pattern for use in transmission of OFDM symbols.

FIG. 6A shows an example cluster pattern 600 employed for transmitting data and pilots. The cluster pattern 600 is shown having a two dimensional appearance in which the horizontal direction is frequency and the vertical direction is time. Each vertical column of circles represents a single sub-carrier over time. Each horizontal row of circles represents a duration of a single OFDM symbol. In the example of FIG. 6A, the cluster includes four contiguous sub-carriers crossing six OFDM symbol durations. In the example of FIG. 6A, second and fifth OFDM symbol durations are used for transmission of pilots and the remaining OFDM symbol durations are used for data. In cluster pattern 600, in the second and fifth OFDM symbol durations, each sub-carrier is used for a pilot.

More generally, parameters such as the number of sub-carriers and OFDM symbol durations in a cluster, the number of pilots used in a cluster and the location of the pilots in the cluster are all implementation specific and may vary from the values of the parameters in the example of FIG. 6A.

Figure 6B:
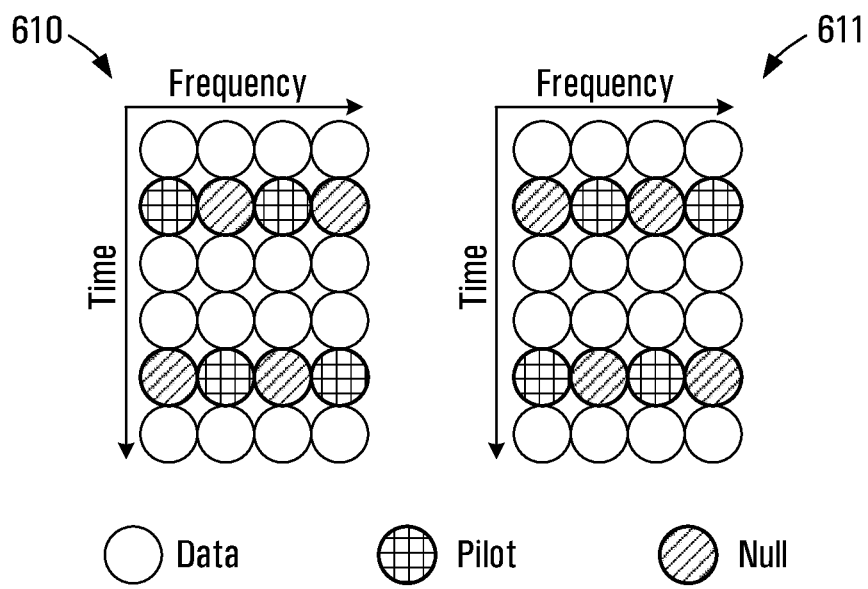
FIG. 6B is a schematic diagram of an example of cluster patterns for use in transmission of OFDM symbols over two antennas, one cluster pattern for each antenna.

In FIGS. 6A and 6B (described below) pilots and data are separated such that for N+M OFDM symbol durations that pilots occupy each sub-carrier of N OFDM symbol durations of the cluster pattern and data occupy each sub-carrier of M OFDM symbol durations of the cluster pattern. Separation of the pilots and data in some embodiments enables pilot sequences occupying the sub-carriers in the cluster to have a reduced PAPR so as to improve a signal to noise ratio for channel estimation. Separation of the pilots and data in some embodiments enables a flexible design that can be used for both OFDM and single-carrier FDM. In some embodiments the separation of pilots and data also enables the pilots and/or data to be spread over sub-carriers or OFDM symbol durations using code division multiplexing techniques.

In some embodiments, clusters are designed to support multiple input multiple output (MIMO) transmission with two or more transmit antennas. FIG. 6B shows an example of a pair of cluster patterns 610, 611 employed for transmitting data and pilots for two transmit antennas using MIMO. In the example of FIG. 6B, second and fifth OFDM symbol durations are used for transmission of pilots and nulls and the remaining OFDM symbol durations are used for data. In the first cluster pattern 610, in the second OFDM symbol duration, first and third sub-carriers are used for pilots and the second and fourth sub-carriers contain nulls during which nothing is transmitted. In the fifth OFDM symbol duration, the second and fourth sub-carriers are used for pilots and the first and third sub-carriers contain nulls. In the second cluster 611, the positioning of the nulls and pilots in OFDM symbol durations is reversed compared to the first cluster 610.

For the two examples shown in FIG. 6B, the pattern of the first cluster 610 can be transmitted from a first antenna, and the pattern of the second cluster 611 can be transmitted from a second antenna. In such an implementation, the second antenna transmits nulls where the first antenna transmits pilots and vice versa. This is useful to ensure accurate reception of the pilots and accurate channel measurement.

More generally, in some embodiments where there are N antennas, pilots for the N antennas are transmitted during selected OFDM symbols, and each antenna transmits its pilots while the remaining N-1 antennas transmit nulls.

More generally, parameters such as the number of sub-carriers and OFDM symbol durations in a cluster, the use of pilots and nulls, the number of pilots used in a cluster and the location of the pilots in the cluster are all implementation specific and may vary from the values of the parameters in the example of FIG. 6B.

In some embodiments multiple different cluster patterns are used for supporting multiple users with a single antenna. In some embodiments multiple different cluster patterns are used for supporting a single user with multiple antennas, single users each with a single antenna that cooperate in sending transmissions or multiple users with multiple antennas. In some embodiments multi-carrier code division multiplexing (MC-CDM) is employed in assigning data and/or pilots in a cluster. MC-CDM is a multiplexing scheme in which a spreading code is used to spread data and/or pilots over multiple sub-carriers and/or OFDM symbol durations.

In some embodiments in a non-MIMO environment, a single cluster pattern similar to one of those described for use in a MIMO environment with pilots and nulls is employed, and a power boost is applied the pilots.

In some embodiments, in a non-MIMO environment, for uplink transmission between mobile terminals and a base station, mobile terminals with a cell identifier having an odd number select a first cluster pattern of a pair of cluster patterns similar to that used in a MIMO environment and the terminals with a cell identifier having an even number select a second cluster pattern of the pair of cluster patterns.

In some embodiments in a non-MIMO environment, when a single cluster pattern of a pair of cluster patterns similar to that used in a MIMO environment employing both pilots and nulls is used for transmission, the null locations for a logical channel that can be used for transmission of additional information.

In some embodiments, a terminal may choose one of the pilot patterns according to instructions from a base station when cooperative MIMO is used. Cooperative MIMO can be implemented by two single antenna transmitters that use corresponding pilot patterns having opposite positioning of pilots and nulls. With cooperative MIMO, two different transmitters transmit using the same frequency resources, and the receiver separates these using MIMO processing techniques.

In some embodiments, in a MIMO environment, multiple antennas are each assigned a different pilot pattern.

Basic access channels are defined using the clusters that make up a frame. In a particular example the BACH may be composed of a number I (for example I=3) of clusters. In some embodiments where each cluster has 16 sub-carriers, each BACH is 16.times.I data sub-carriers. More generally, the number of clusters in a BACH and the number of data sub-carriers in a BACH are implementation specific and are not limited by the particular example.

In some embodiments, there are two types of BACH: diversity BACH and sub-band BACH. Diversity BACH and sub-band BACH are logical sub-channelizations or mappings performed on the clusters in each BACH. In diversity BACH, the set of clusters that make up the BACH are mapped to locations that are spread out within the overall OFDM symbol sub-carrier set. In sub-band BACH, the set of clusters that make up the BACH are contiguous within the overall OFDM symbol sub-carrier set. In some embodiments the two types of BACH co-exist in a same OFDM symbol sub-carrier set.

In a particular example, a transmission frame includes six OFDM symbols. The transmission frame is further divided into a plurality of clusters N. Each BACH in the transmission frame consists of three clusters. Therefore, the transmission frame includes N/3 BACH. Each of the N/3 BACH can be one of two different formats: a first format includes L diversity groups and K sub-band groups, such that L+K=N/3.

The values are N, L and K are implementation specific parameters. More generally, the number of OFDM symbols in a transmission frames can be greater than or less than six. Also, the number of clusters in a BACH can be greater than or less than three.

In some embodiments, each sub-carrier of particular OFDM symbol durations in the cluster are used for pilots and each sub-carrier of the other OFDM symbol durations are used for data. This is true for the examples of FIGS. 6A and 6B. In some embodiments, by separating pilots and data in this manner different types of processing can be supported for pilots and for data.

In some embodiments, data for multiple users is transmitted using the same sub-carrier frequencies by multiplexing the data from multiple users using CDM techniques, and using pilots that are individually assigned to particular sub-carriers in the cluster. In some embodiments pilots are assigned on a per antenna basis. In some embodiments pilots are assigned on a per user basis. In some embodiments pilots are assigned on a per antenna per user basis. In some embodiments CDM techniques are used for multiplexing pilot information as well as data. In some embodiments CDM techniques are used for multiplexing pilot information but not data. CDM multiplexing for pilots will be described in detail below.

In some embodiments multi-carrier code division multiplexing (MC-CDM) techniques are used for assigning data and pilots to reduce interference variation for OFDM transmission. In some implementations, using MC-CDM enables N users to access the same BACH. In some implementations, using MC-CDM enables processing gain to improve coverage in the region of the transmitter.

In some embodiments MC-CDM techniques are used for assigning data and pilots in up-link (UL) communication between a mobile terminal and a base station (BS). For such embodiments, multiple users can transmit using the same frequency resource but with different spreading codes to separate their data and/or to separate their pilots. Where a given user is a multi-antenna user, a respective different spreading code is assigned to each antenna for each of data and/or pilots.

In some embodiments MC-CDM techniques are used for assigning data and pilots for down-link (DL) communication between the BS and the mobile terminal. For such embodiments, transmissions to multiple users can be made on a single antenna using the same frequency resource but with different spreading codes to separate their data and/or to separate their pilots in which case the transmissions to the multiple users are added together prior to transmission. Alternatively, transmissions to multiple users can be made on multiple antennas using the same frequency resource but with different spreading codes to separate their data and/or to separate their pilots.

Where a given user is a multi-antenna user, a respective different spreading code is assigned to each antenna for each of data and/or pilots.

In some embodiments user separation by spreading is based on spreading codes with a length of N, where N may be equal to the number of users that can occupy a frequency resource (for example, a cluster), although other values of N can be used. Given a set of M data symbols, after spreading there will be M×N symbols. Where M data symbols might have been transmitted using a single (more generally L) clusters or basic access channels, after spreading M (more generally M×L) clusters or basic access channels are needed.

In some embodiments, to enable efficient channel estimation, clusters are grouped together and allocated in groups. For example, in a particular implementation, each group contains two clusters and is referred to as a cluster pair. The examples below assume grouping in cluster pairs, but it should be readily apparent how the same approaches could be applied to different sized groups.

Figure 7A:
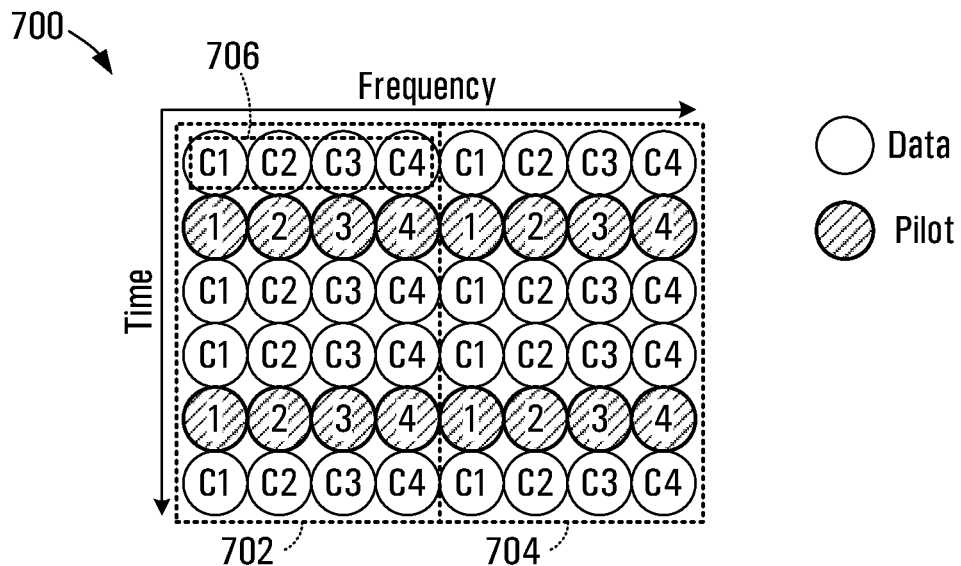
FIGS. 7A, 7B and 7D are schematic diagrams of examples of cluster patterns used for transmission of OFDM symbols using code division multiplexing (CDM) for transmission of data according some embodiments of the invention.

FIG. 7A shows an example cluster pattern 700 for use with up to four users in a non-MIMO environment using MC-CDM according to an embodiment of the invention. The cluster pattern 700 includes a cluster pair consisting of a first cluster 702 and a second cluster 704 that are contiguous in the frequency direction.

In FIG. 7A code spreading occurs in the frequency direction. The data of each of up to four users is spread over the four sub-carriers in each cluster 702,704 using a particular code assigned to that user, generally indicated at 706. The particular code for a single user is shown and includes code elements C1, C2, C3 and C4 that correspond to the four sub-carriers, respectively. In some implementations, a respective cluster pattern like that of FIG. 7A is transmitted from each of multiple (four in the example) antennas (of one or multiple transmitters), each using a different spreading pattern, and each containing only one of the four pilots. This would be appropriate for up-link use, for example for transmissions from multiple mobile stations to a base station. In other implementations, the cluster represents the sum of content transmitted for four different users from a single transmitter in which the data locations are summed for the four users after being spread differently prior to transmission. This would be appropriate for down-link use, for example for transmissions from a base station to multiple mobile stations. For multiple single user antennas, in those sub-carrier positions, what is transmitted is effectively summed in the air during transmission. Pilots for each of up to four users are transmitted. These are labeled as "1" for a first user, "2" for a second user, "3" for a third user and "4" for a fourth user and are illustrated being transmitted in a second and a fifth OFDM symbol duration. When there are less than four users, each user may have more than one pilot. For example, for two users, pilots 1 and 2 are for a first user and pilots 3 and 4 are for a second user.

The pilots inserted for each user form a scattered pilot pattern that can be used to perform channel estimation, and from which channel estimates for other sub-carrier positions can be determined through interpolation. In some embodiments, the four pilots are arranged in a different order for each OFDM symbol duration that contains the pilots in the cluster. In other embodiments, the four pilots are arranged in a same order for two or more OFDM symbol durations that contain the pilots in the cluster.

For example for a spreading code length of four, four users may transmit over four BACH simultaneously, each user being assigned a different spreading code. A spreading code length of four would also enable only a single user to transmit over four BACH with a larger processing gain. Processing gain is a ratio of transmission bandwidth to information bandwidth that helps to measure a performance advantage of code spreading over narrowband signals. A spreading code length of four would also enable two users to transmit over four BACH with a larger processing gain than four users, but a smaller processing gain than one user.

Figure 7B:
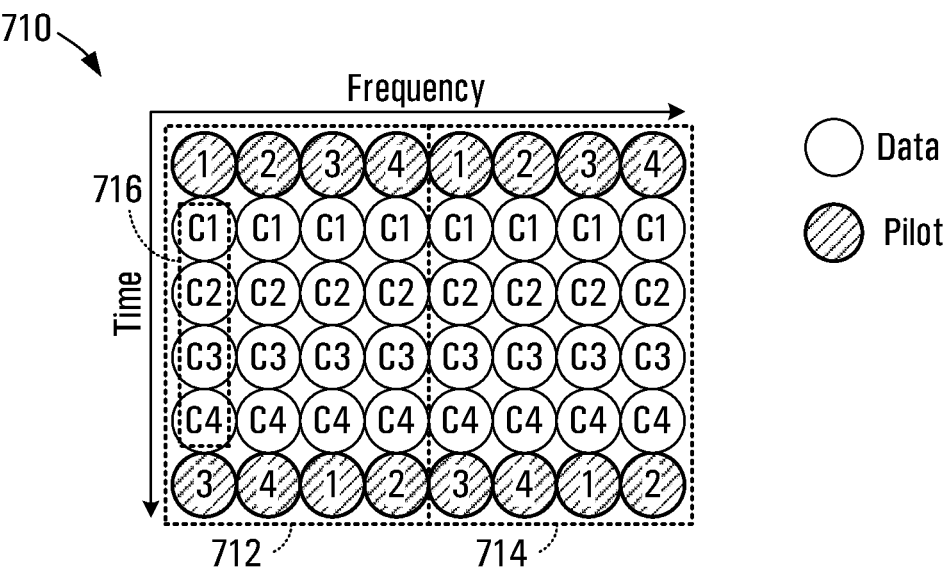

FIG. 7B shows another example of a cluster pattern 710 for up to four users in which the cluster pattern 710 includes a cluster pair consisting of a first cluster 712 and a second cluster 714 that are contiguous in the frequency direction, generally indicated at 716. In the example of FIG. 7B, code spreading occurs in the time direction. Data of each user is spread over four OFDM symbol durations in each sub-carrier of the cluster using a particular code assigned to that user. For each user the particular code includes code elements C1, C2, C3 and C4 that correspond to the four OFDM symbol durations, respectively. For multiple single user antennas, in those sub-carrier positions, what is transmitted is a summed in the air during transmission. For multiple multi-user antennas, in those sub-carrier positions, what is transmitted may be summed in the transmitter before transmission. Four pilots labeled as "1" for a first user, "2" for a second user, "3" for a third user and "4" for a fourth user are transmitted in first and sixth OFDM symbol durations. When there are less than four users, each user may have more than one pilot. For example, for two users, pilots 1 and 2 are for a first user and pilots 3 and 4 are for a second user. In some embodiments, the four pilots are arranged in a different order for each OFDM symbol duration that contains the pilots in the cluster. In other embodiments, the four pilots are arranged in a same order for two or more OFDM symbol durations that contain the pilots in the cluster.

In some implementations, a respective cluster pattern like that of FIG. 7B is transmitted from each of multiple (four in the example) antennas (of one or multiple transmitters), each using a different spreading pattern, and each containing only one of the four pilots. This would be appropriate for up-link use, for example for transmissions from multiple mobile stations to a base station. In other implementations, the cluster represents the sum of content transmitted for four different users from a single transmitter in which the data locations are summed for the four users after being spread differently prior to transmission. This would be appropriate for down-link use, for example for transmissions from a base station to multiple mobile stations.

Furthermore, assignment of OFDM symbol durations in which each sub-carrier of the respective OFDM symbol duration is used for pilot transmission is an implementation specific parameter.

If the clusters of FIGS. 7A and 7B are used for a single user having a single spreading code on a single antenna, the processing gain, or spreading factor, is larger compared to when the clusters are used for multiple users with each user employing a different spreading code. Conversely, the greater the number of users, the smaller the processing gain.

In a particular example, six cluster pairs are used to support four BACHs for four users. More specifically, from an available frequency bandwidth, six cluster pairs are collectively assigned to four users, with the four users each using all of the six cluster pairs and their content is respectively separated by using different CDM codes.

Figure 7C:
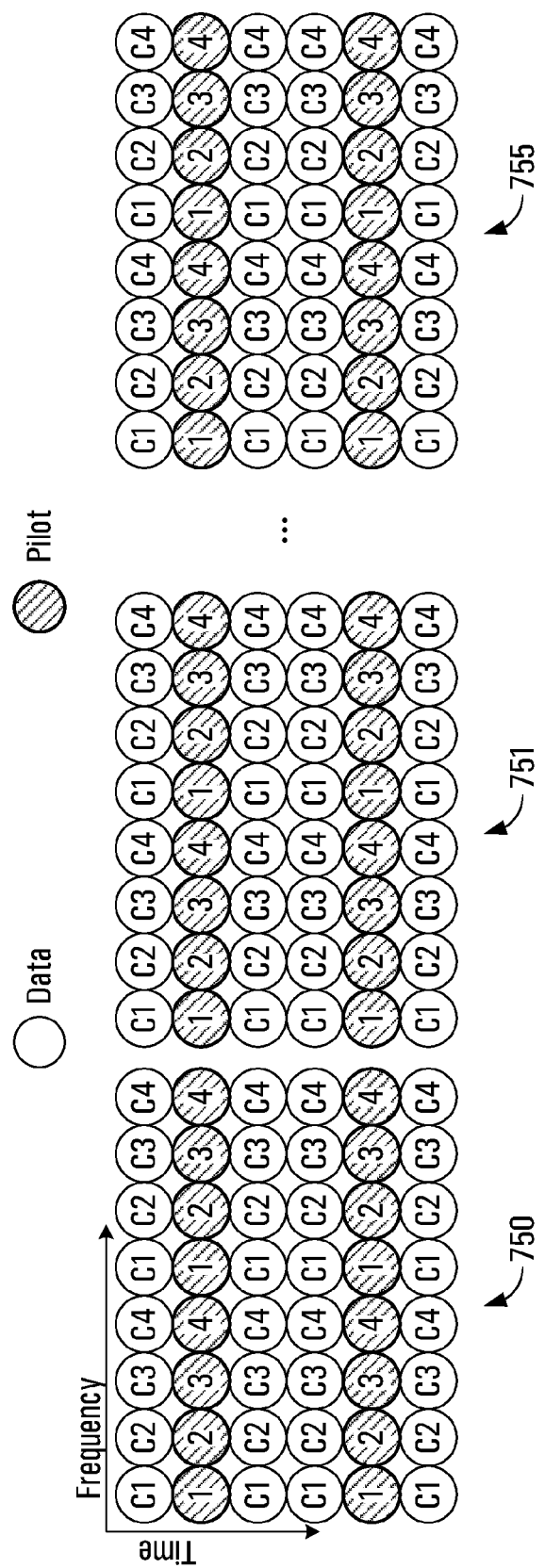
FIG. 7C is a schematic diagram of six cluster pairs used for transmission of OFDM symbols using CDM for transmission of data according an embodiment of the invention.

FIG. 7C shows an example of six cluster pairs 750-755 used to support four BACHs for four users.

The clusters of FIG. 7C employ the pattern of FIG. 7A. It is to be understood that the cluster pattern is an implementation specific parameter and reflects various embodiments described above. More generally, the number of cluster pairs used to support a given number channels for a given of users is implementation specific. Once again, the FIG. 7C patterns can be used for the up-link or down-link as described previously for the other examples.

Figure 7D:
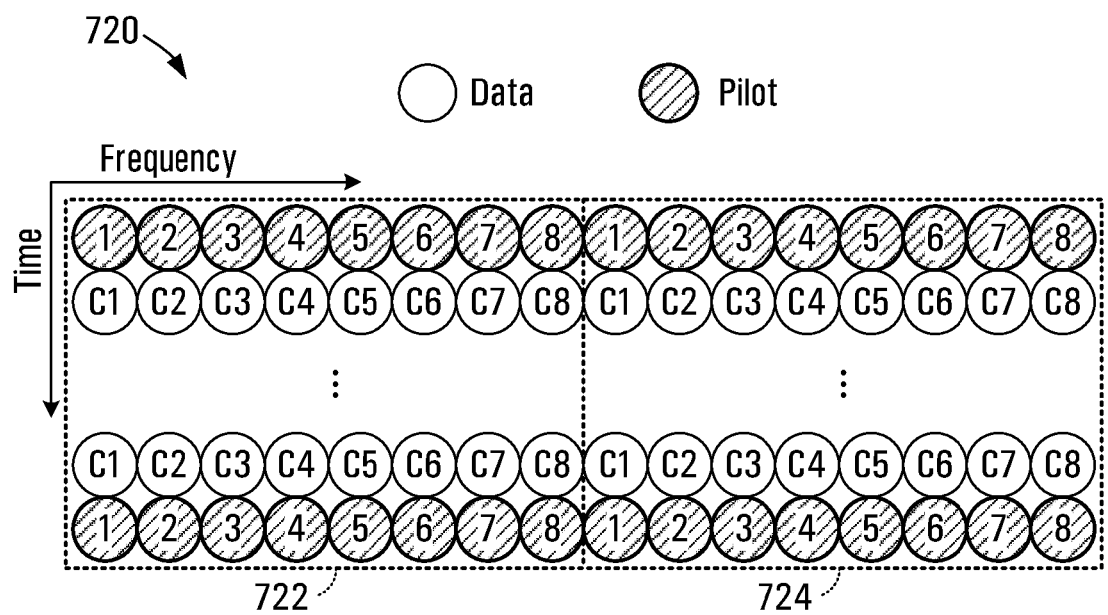

FIGS. 7A-C show cluster patterns in which the spreading code spreads data of each of up to four users over the four sub-carriers in each cluster. More generally, the number of sub-carriers over which data can be spread for multiple users can be greater or less than four. FIG. 7D shows an example of a cluster pattern 720 for use by each user in which the cluster pattern 720 includes a cluster pair consisting of a first cluster 722 and a second cluster 724 that are contiguous in the frequency direction. In this case, a cluster is eight sub-carriers over N+2 OFDM symbol durations two of which contain pilots and N of which contain data. The data of each user is spread over eight sub-carriers in each cluster using spreading code elements C1 to C8. A longer spreading code results in a larger cluster. In this example, spreading occurs in the frequency direction. The first and last OFDM symbols of the cluster pair 720 contain pilot locations for up to eight different users labeled "1" through "8" respectively; since there is a length eight spreading code, up to eight different users can be transmitted using the same cluster. Once again, the FIG. 7D pattern can be used for the up-link or down-link as described previously for the other examples.

In some embodiments the spreading can occur in the time direction over multiple OFDM symbols as opposed to spreading occurring in the frequency direction as shown in FIG. 7D.

Furthermore, assignment of OFDM symbol durations in which each sub-carrier of the OFDM symbol duration is used for pilot transmission is an implementation specific parameter and is not limited to the first and last OFDM symbol durations of the cluster as shown in FIG. 7D, but may be assigned to any of the symbols durations in the cluster. Also, in some embodiments, the eight pilots are arranged in a different order for each OFDM symbol duration that contains the pilots in the cluster. In other embodiments, the eight pilots are arranged in a same order for two or more OFDM symbol durations that contain the pilots in the cluster.

More generally, parameters such as the number of sub-carriers and OFDM symbol durations in a cluster, the use of pilots and nulls, the number of pilots used in a cluster and the location of the pilots in the cluster are all implementation specific and may vary from the values of the parameters in the examples of FIGS. 7A-7D.

In single user or multiple user MIMO implementations, cluster patterns are defined to include data locations and pilot locations. Each pilot location is turned on, or active, for one of the antennas such that the pilots do not interfere with each other. The data locations can be used by all antennas. Code spreading is employed to separate the data transmitted on the different antennas, and to separate the data transmitted on one antenna. Various specific examples are given below.

In some embodiments a cluster pattern is formed by a group of two cluster pairs that are contiguous in frequency or consecutive in time. A respective cluster pattern thus formed is transmitted from each of two transmit antennas. More generally, a cluster pattern can be formed by combining N groups of cluster pairs, and transmitting a respective cluster having such a pattern over each of N transmit antennas, where N>=2.

Figure 8A:
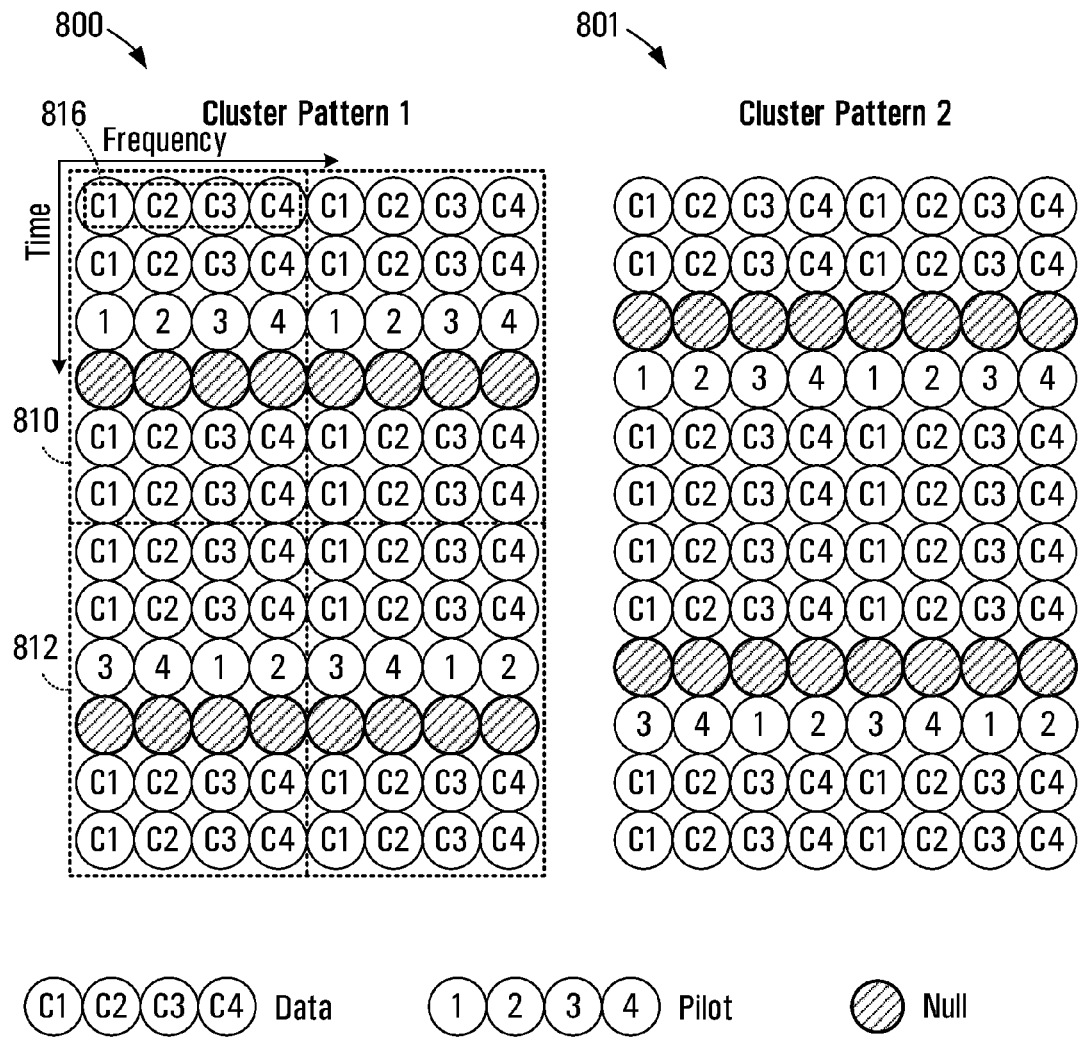
FIGS. 8A, 8B, 8C, 8D and 8E are schematic diagrams of examples cluster pattern used for transmission of MIMO-OFDM symbols using CDM for transmission of data according to some embodiments of the invention.

FIG. 8A shows an example of cluster patterns 800, 801 for transmission by a first and second antennas respectively for one or multiple users in a MIMO environment using MC-CDMA in accordance with an embodiment of the invention. The cluster pattern 800 includes a first cluster pair 810 and a second cluster pair 812 for consecutive transmission by a first antenna. In each of the two cluster pairs 810,812 code spreading of the data occurs in the frequency direction as generally indicated at 816. In the illustrated example, each data symbol is spread by a factor of four, and the content for four different users after spreading is combined for each data location. In the first cluster pair 810 of the first cluster pattern 800, sub-carriers of a third OFDM symbol duration are dedicated to pilot transmission and sub-carriers of a fourth OFDM symbol duration are left blank so as not to interfere with pilots transmitted on the second antenna. In the second cluster pair 812 of the first cluster pattern 800, sub-carriers of the third OFDM symbol duration are dedicated to pilot transmission and the sub-carriers of the fourth OFDM symbol duration are left blank so as not to interfere with pilots transmitted on the second antenna. In some embodiments the pilots in the second cluster pair 812 are ordered differently than those of the first cluster pair 810.

Similarly, in the second cluster pattern 801, the sub-carriers of the third OFDM symbol duration are left blank so as and sub-carriers of the fourth OFDM symbol duration are dedicated to pilot transmission.

In the illustrated example, for the first antenna pattern 800, pilots for up to four different users are transmitted and are labeled "1", "2", "3" and "4" respectively. The pilots for a given user are scattered in frequency and time so as to allow interpolation of channel estimates. A similar arrangement of pilots for four users is shown in the second cluster pattern 801. A total of up to eight users can be supported with this example. Fewer spreading codes can be used to increase the spreading gain of each user. In some embodiments, multiple spreading codes can be assigned to a given user.

More generally, the number of sub-carriers and OFDM symbol durations in a cluster are configurable for different size clusters. Also the number of OFDM symbol durations employed for pilots and nulls in a cluster are configurable. In addition, any one or more OFDM symbol duration of a cluster can be selected for assigning pilots and/or nulls to each of the sub-carriers in the selected OFDM symbol duration.

In some embodiments, the ordering of pilots is different for each OFDM symbol duration that contains the pilots in the cluster. In other embodiments, the ordering of pilots is the same for two or more OFDM symbol durations that contain the pilots in the cluster.

Figure 8B:
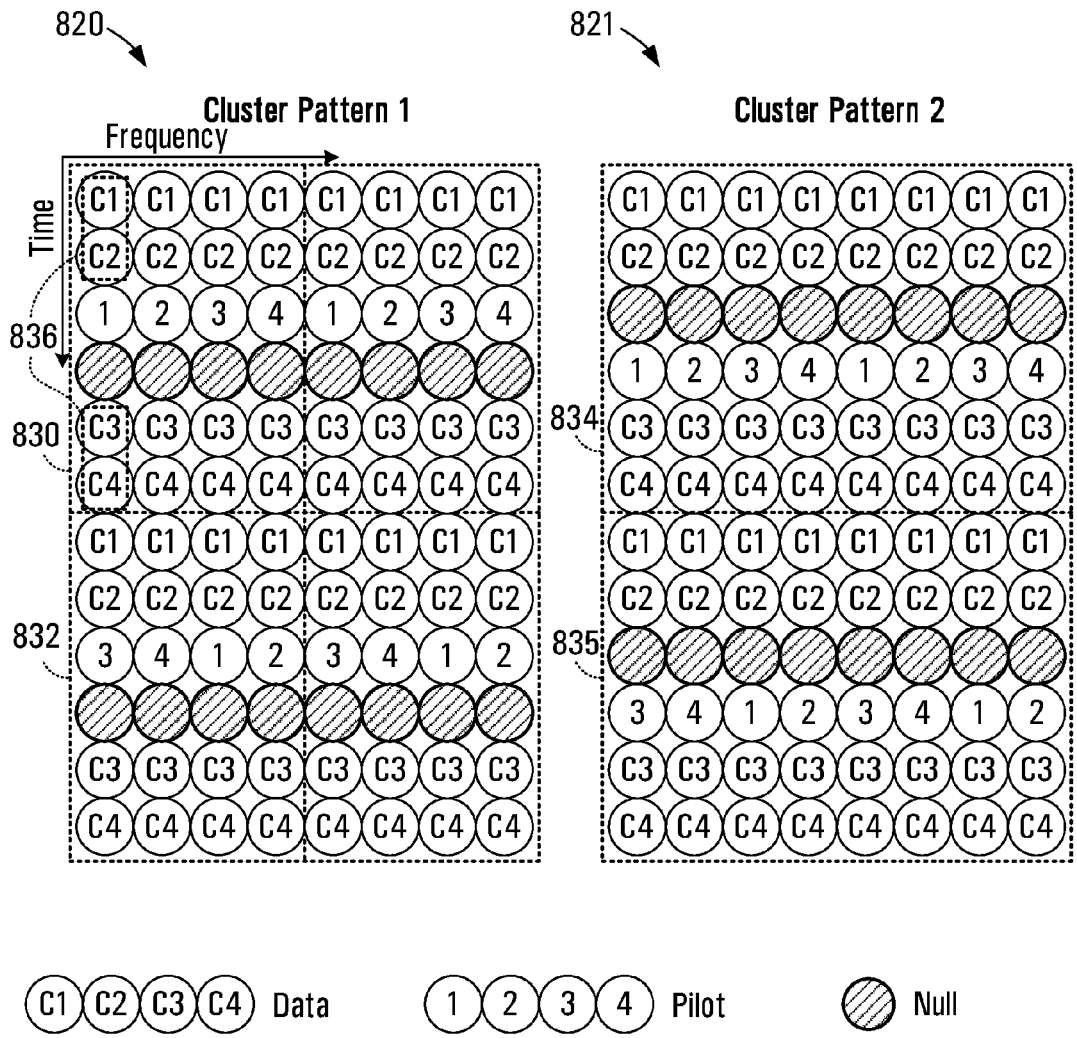

FIG. 8B shows another example of cluster patterns 820,821 for transmission by a first and second antennas respectively for one or multiple users in a MIMO environment using MC-CDMA. Each cluster pattern 820,821 includes first and second cluster pairs (830,832 in the first cluster pair and 834,835 in the second cluster pair) that are contiguous in time. In the two cluster patterns 820,821, code spreading of the data occurs in the time direction as indicated by 836. In the illustrated example, the location of the data and pilot sub-carriers is the same as that described above with reference to FIG. 8A.

More generally, the number of sub-carriers and OFDM symbol durations in a cluster are configurable for different size clusters. Also the number OFDM symbol durations employed for pilots and nulls in a cluster are configurable. In addition, any one or more OFDM symbol duration of a cluster can be selected for assigning pilots and/or nulls to each of the sub-carriers in the selected OFDM symbol duration.

In some embodiments, the ordering of pilots is different for each OFDM symbol duration that contains the pilots in the cluster. In other embodiments, the ordering of pilots is the same for two or more OFDM symbol durations that contain the pilots in the cluster.

Figure 8C:
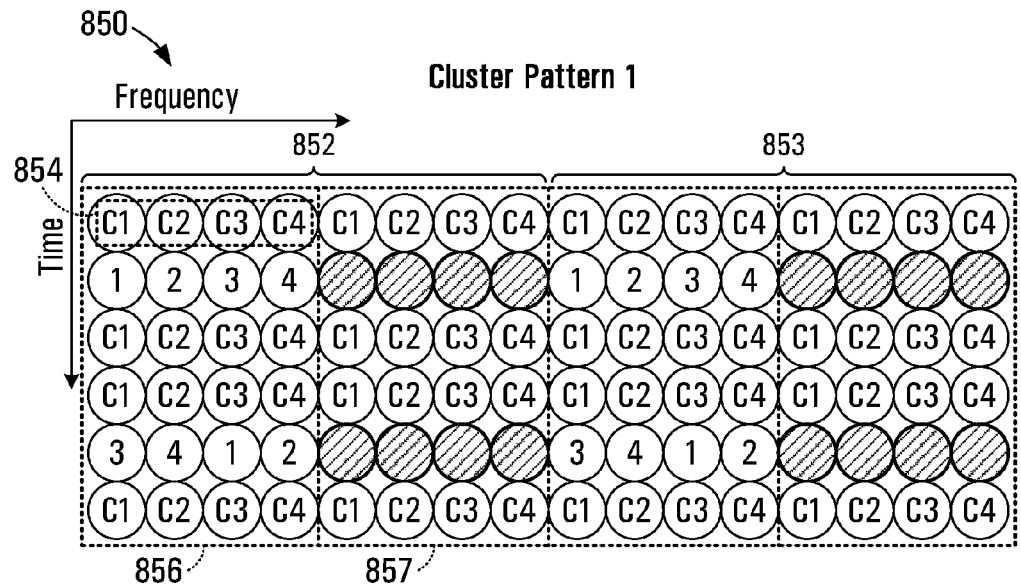
Figure 8C:
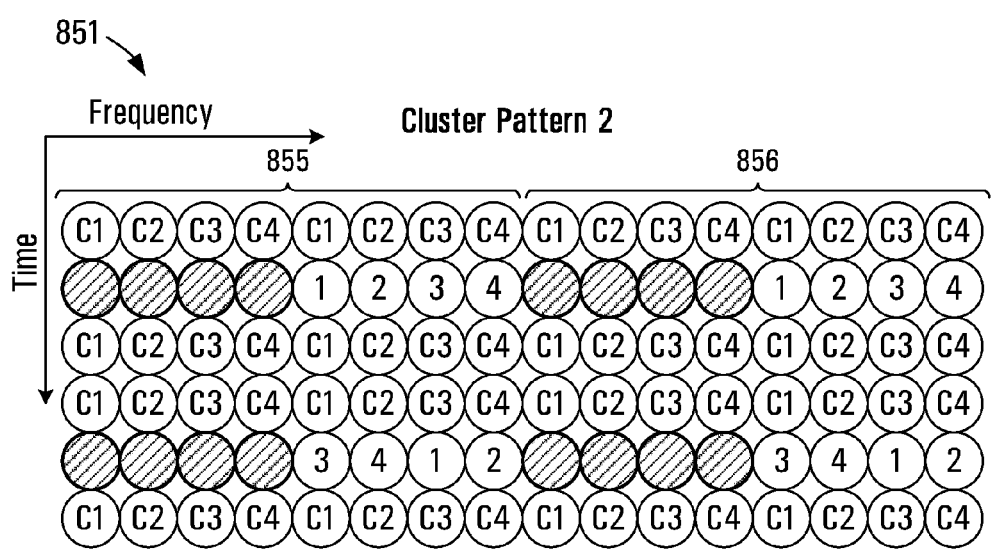

FIG. 8C shows another example of a first and second cluster patterns 850,851 for transmission by two antennas. Each cluster pattern 850,851 includes first and second cluster pairs (852,853 in the first cluster pair and 855,856 in the second cluster pair) that are contiguous in frequency. In the two cluster patterns 850,851, code spreading of the data occurs in the frequency direction as indicated by 854. In a first cluster 856 of the first cluster pair 852 of the first cluster pattern 850, sub-carriers of a second OFDM symbol duration and a fifth OFDM symbol duration are dedicated to pilot transmission. In a second cluster 857 of the first cluster pair 852 of the first cluster pattern 850, sub-carriers of the second OFDM symbol duration and the fifth OFDM symbol duration are left blank. The pilots in the second cluster pair 853 are ordered differently than those of the first cluster pair 852. The second cluster pair 853 of the first cluster pattern 850 is substantially the same as the first cluster pair 852. In the second cluster pattern 851 the arrangement of OFDM symbol durations assigned to the pilots and nulls are reversed so that the pilots transmitted by the two antennas do not interfere with each other. The content of one or up to eight users can be transmitted as in previous examples.

More generally, the number of sub-carriers and OFDM symbol durations in a cluster are configurable for different size clusters. Also the number of rows of OFDM symbol durations and employed for pilots and nulls in a cluster are configurable. In addition, any one or more OFDM symbol duration of a cluster can be selected for assigning pilots to some of the sub-carrier and nulls to remaining sub-carriers in the selected OFDM symbol duration.

In some embodiments, the ordering of pilots is different for each OFDM symbol duration that contains the pilots in the cluster. In other embodiments, the ordering of pilots is the same for two or more OFDM symbol durations that contain the pilots in the cluster.

Figure 8D:
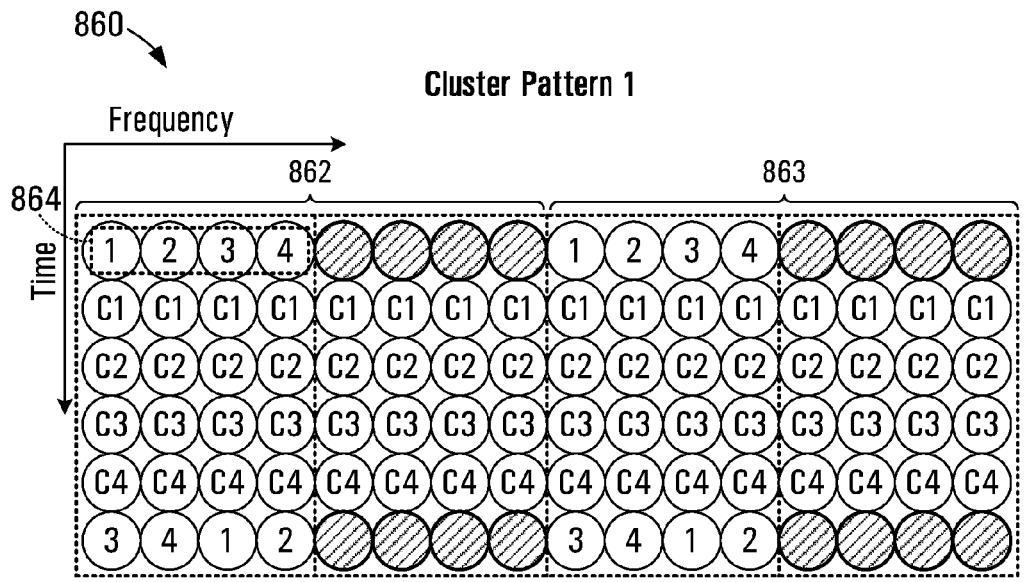
Figure 8D:
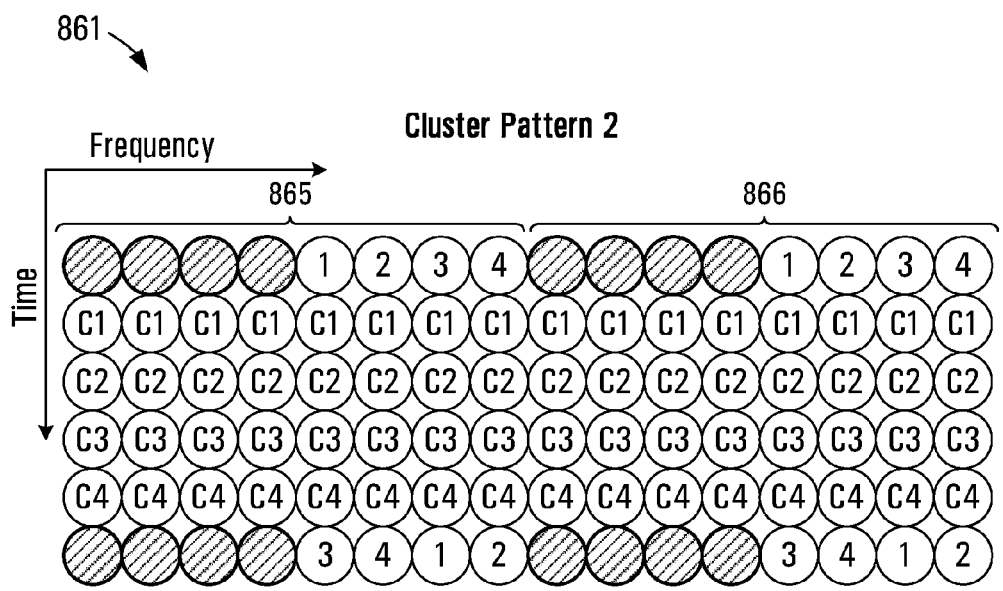

FIG. 8D shows another example of first and second cluster patterns 860,861 for transmission by two antennas. FIG. 8D is similar to FIG. 8C in that each cluster pattern 860,861 includes first and second cluster pairs (862,863 in the first cluster pair and 865,866 in the second cluster pair) that are contiguous in frequency. However, in the two cluster pairs 862,863 of FIG. 8D, code spreading of the data occurs in the time direction as indicated by 864. Also, assigned OFDM symbol durations in which pilots and nulls occur are different.

More generally, the number of sub-carriers and OFDM symbol durations in a cluster are configurable for different size clusters. Also the number of rows of OFDM symbol durations and employed for pilots and nulls in a cluster are configurable. In addition, any one or more OFDM symbol duration of a cluster can be selected for assigning pilots to some of the sub-carrier and nulls to remaining sub-carriers in the selected OFDM symbol duration.

In some embodiments, the ordering of pilots is different for each OFDM symbol duration that contains the pilots in the cluster. In other embodiments, the ordering of pilots is the same for two or more OFDM symbol durations that contain the pilots in the cluster.

Figure 8E:
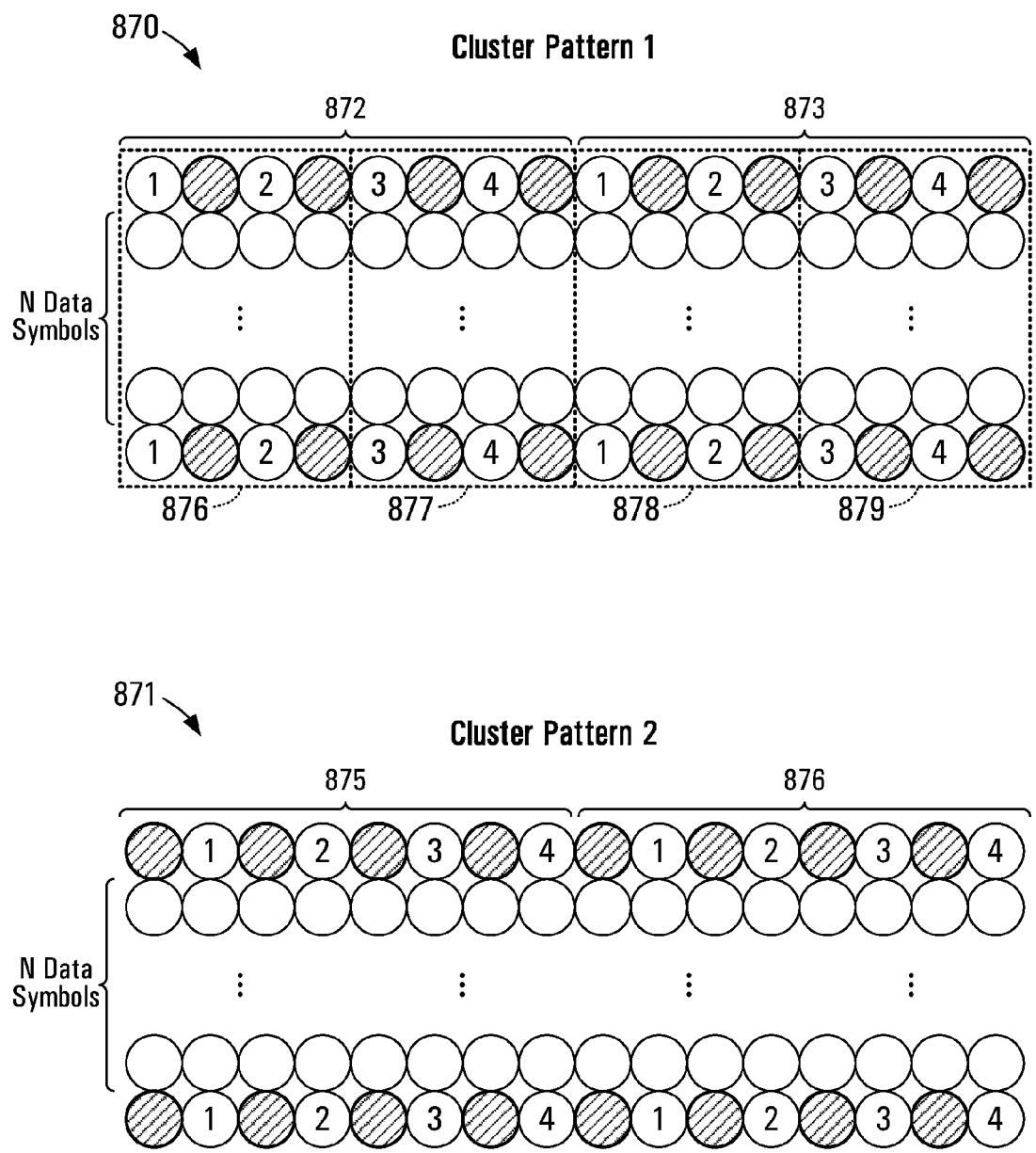

FIG. 8E is yet another example of first and second cluster patterns 870,871 for transmission by two antennas. Each cluster pattern 870,871 includes two cluster pairs (872,873 in the first cluster pair and 875,876 in the second cluster pair) that are contiguous in frequency. In this example the pilots are transmitted on sub-carriers in each of a first OFDM symbol duration and a last OFDM symbol duration of the cluster and data is transmitted on the sub-carriers of OFDM symbol durations in-between the first and last OFDM symbol durations. In contrast to the examples of FIGS. 8A to 8D where pilots of a given antenna were inserted in groups of consecutive OFDM sub-carrier locations, in the example of FIG. 8E pilots of a given antenna are inserted in alternating OFDM sub-carrier locations. In each cluster 876,877,878,879 of the first cluster pattern 870, first and third sub-carriers are dedicated to pilot transmission and second and fourth sub-carriers are blank. The first and third sub-carriers of the first two clusters 876,877 transmit first, second, third and fourth pilots labeled as 1,2,3 and 4, respectively interspersed with nulls and this pattern is repeated in the second two clusters 878, 879. In the second cluster pattern 871 the arrangement of the pilots and nulls are reversed, such that there is space-time diversity for the pilots transmitted at different times from different antenna. The content of one or up to eight users can be transmitted as in previous examples with spreading in the time or frequency direction.

More generally, in the example of FIG. 8E, the pilots are assigned to even sub-carriers and nulls are assigned to odd sub-carriers in clusters, or vice versa.

More generally, the number of sub-carriers and OFDM symbol durations in a cluster are configurable for different size clusters. Also the number of rows of OFDM symbol durations and employed for pilots and nulls in a cluster are configurable. In addition, any one or more OFDM symbol duration of a cluster can be selected for assigning pilots to some of the sub-carriers and nulls to remaining sub-carriers in the selected one or more OFDM symbol duration.

In some embodiments, the ordering of pilots is different for each OFDM symbol duration that contains the pilots in the cluster. In other embodiments, the ordering of pilots is the same for two or more OFDM symbol durations that contain the pilots in the cluster.

Furthermore, the assignment of OFDM symbol durations used for pilots as opposed to data is an implementation specific parameter.

Figure 9:
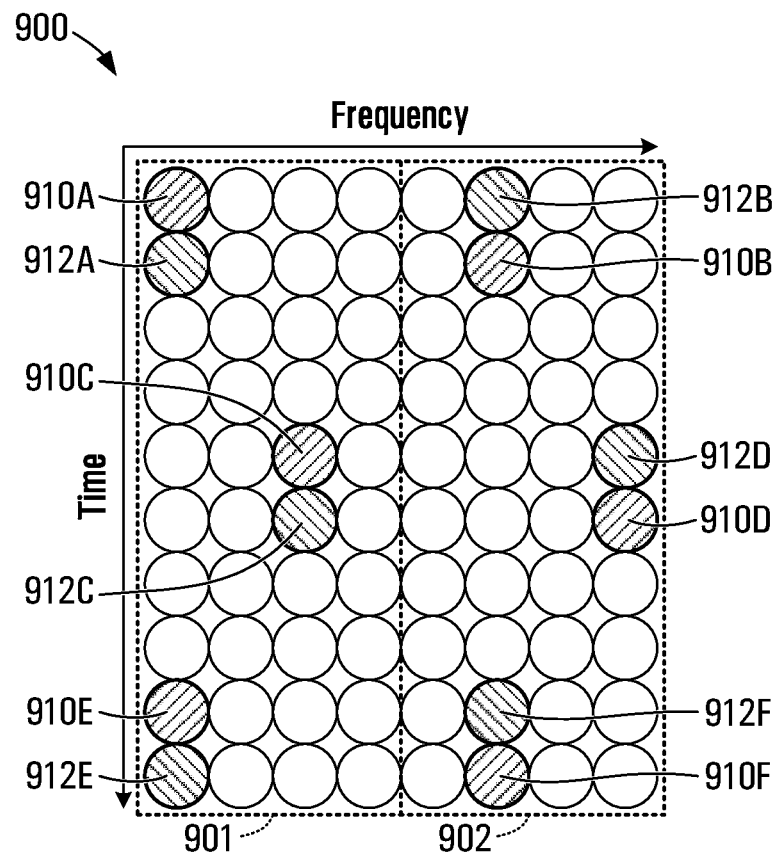
FIG. 9 is a schematic diagram of a cluster pattern used for transmission of OFDM symbols including data and pilots for two antennas according to an embodiment of the invention.

In some embodiments, an arbitrarily defined scattered pilot cluster pattern is inserted for each antenna and/or each user. FIG. 9 shows a specific example of this, where cluster patterns for two users are shown in a single cluster pair. The cluster pair includes first and second clusters 901,902 that are contiguous in the frequency direction, each cluster having four sub-carriers over ten OFDM symbol durations. In FIG. 9, there are two pilot groups 910,912 each having six pilots. More specifically, the first pilot pattern 910 consists of a first pilot 910A located at a first OFDM symbol duration of a first sub-carrier in the first cluster 901, a second pilot 910B located at a second OFDM symbol duration of a second sub-carrier in a second cluster 902, a third pilot 910C located at a fifth OFDM symbol duration of a third sub-carrier in the first cluster 901, a fourth pilot 910D located at a sixth OFDM symbol duration of a fourth sub-carrier in the second cluster 902, a fifth pilot 910E located at a ninth OFDM symbol duration of the first sub-carrier in the first cluster 901, and a pilot element 910F located at a tenth OFDM symbol duration of the second sub-carrier in the second cluster 902. The second pilot group 912 consists of a first pilot 912A located at the second OFDM symbol duration of the first sub-carrier in the first cluster 901, a second pilot 912B located at the first OFDM symbol duration of the second sub-carrier in a second cluster 902, a third pilot 912C located at the sixth OFDM symbol duration of the third sub-carrier in the first cluster 901, a fourth pilot 912D located at the fifth OFDM symbol duration of the fourth sub-carrier in the second cluster 902, a fifth pilot 912E located at the tenth OFDM symbol duration of the first sub-carrier in the first cluster 901, and a sixth pilot 912F located at the ninth OFDM symbol duration of the second sub-carrier in the second cluster 902.

In a single antenna case, each of two users can be assigned one of the two cluster patterns. A first user transmits pilots in the locations of the first pilot group 910 and a second user transmits pilots in the locations of the second pilot group 912.

The pilot pattern can be used for two antennas each assigned to one user. A first antenna transmits pilots in the locations of the first pilot group 910 and a second antenna transmits pilots in the locations of the second pilot group 912.

It is to be understood that the number of elements in each pilot group is implementation specific and can be greater than or less than six elements, as shown in FIG. 9. It is to be understood that the number of pilot groups is implementation specific and can be greater than or less than two elements, as shown in FIG. 9.

In some embodiments the pilot locations in a pilot group are a group of pilot locations that are contiguous in time and/or frequency. More generally, the pilot locations of a pilot group can be a collection of pilot locations each assigned to any particular sub-carrier of an OFDM symbol duration.

Figure 10:
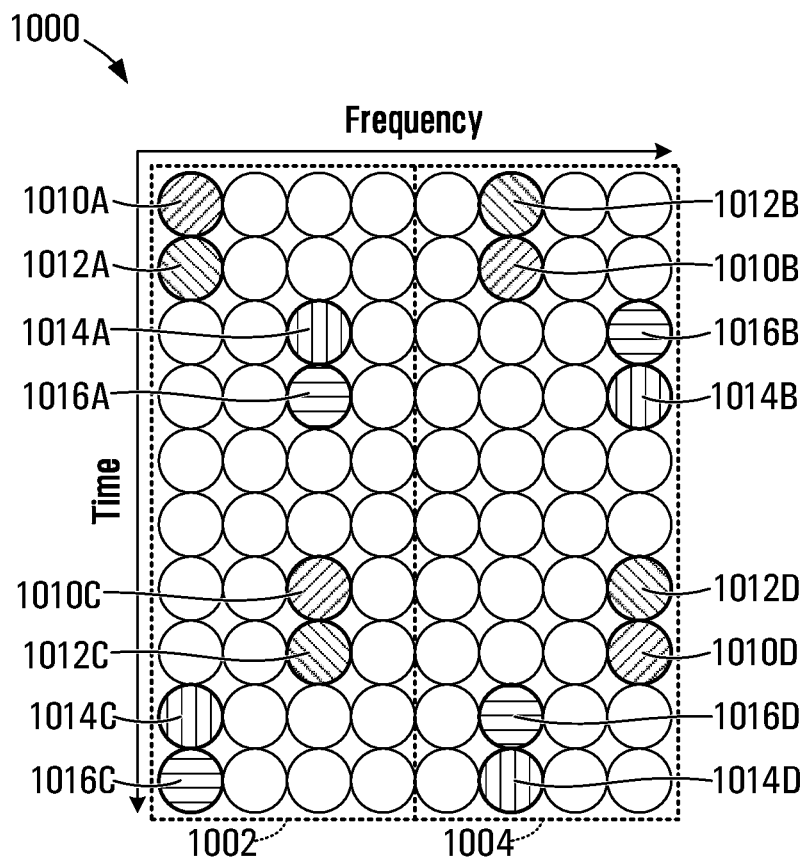
FIG. 10 is a schematic diagram of a cluster pattern used for transmission of OFDM symbols including data and pilots for four antennas according to an embodiment of the invention.

FIG. 10 shows an assignment of pilots in a cluster pattern 1000 in accordance with an embodiment of the invention. The cluster pattern 1000 includes first and second clusters 1002, 1004 that are contiguous in the frequency direction, each cluster having four sub-carriers over ten OFDM symbol durations. In FIG. 10, there are four pilot groups 1010,1012,1014, 1016 each having four elements. Each element within the cluster has a location defined by a OFDM symbol duration and a sub-carrier.

In the illustrated example, in the cluster pattern 1000, a first pilot group 1010 is assigned to a first element 1010A located at a first OFDM symbol duration of a first sub-carrier in the first cluster 1002, a second element 1010B located at a second OFDM symbol duration of a second sub-carrier in the second cluster 1004, a third element 1010C located at a seventh OFDM symbol duration of a third sub-carrier in the first cluster 1002 and a fourth element 1010D located at an eighth OFDM symbol duration of a fourth sub-carrier in the second cluster 1004. A second pilot group 1012 is assigned to a first element 1012A located at a second OFDM symbol duration of the first sub-carrier in the first cluster 1002, a second element 1012B located at the first OFDM symbol duration of the second sub-carrier in the second cluster 1004, a third element 1012C located at the eighth OFDM symbol duration of the third sub-carrier in the first cluster 1002 and a fourth element 1012D located at the seventh OFDM symbol duration of the fourth sub-carrier in the second cluster 1004. A third pilot group 1014 is assigned to a first element 1014A located at a third OFDM symbol duration of the third sub-carrier in the first cluster 1002, a second element 1014B located at a fourth OFDM symbol duration of the fourth sub-carrier in the second cluster 1004, a third element 1014C located at a ninth OFDM symbol duration of the first sub-carrier in the first cluster 1002 and a fourth element 1014D located at a tenth OFDM symbol duration of the second sub-carrier in the second cluster 1004. A fourth pilot grouping is assigned to a first element 1016A located at the fourth OFDM symbol duration of the third sub-carrier in the first cluster, a second element 1016B located at the third OFDM symbol duration of the fourth sub-carrier in the second cluster, a third element 1016C located at the tenth OFDM symbol duration of the first sub-carrier in the first cluster and a fourth element 1016D located at the ninth OFDM symbol duration of the second sub-carrier in the second cluster.

In a single antenna case, four users are each assigned four pilots, one pilot to each pilot location in a respective pilot group.

In single user MIMO operation, four antennas each with a single user are assigned four pilots, one pilot to each pilot location in a respective pilot group. In multi user MIMO operation, two antennas each with a two users are assigned four pilots, one pilot to each pilot location in a respective pilot group More generally, parameters such as the number of sub-carriers and OFDM symbol durations in a cluster, the use of pilots and nulls, the number of pilots used in a cluster and the location of the pilots in the cluster are all implementation specific and may vary from the values of the parameters in the examples of FIG. 10.

It is to be understood that the number of elements in each pilot group is implementation specific and can be greater than or less than four elements, as shown in FIG. 10. It is to be understood that the number of pilot groups is implementation specific and can be greater than or less than four elements, as shown in FIG. 10.

In some embodiments the pilot locations in a pilot group are a group of pilot locations that are contiguous in time and/or frequency. More generally, the pilot locations of a pilot group can be a collection of pilot locations each assigned to any particular sub-carrier of an OFDM symbol duration.

In the examples described thus far, no CDM has been applied to the pilots. In some embodiments, the pilots are also scattered within the cluster using CDM techniques.

With CDM pilot spreading, pilots are organized into groups of N (where N>=2), and code spreading is employed to allow pilot transmission to occur on all of the pilots in each group for multiple users in a manner similar to that described in detail above for spreading of data. For a given user, a single pilot is spread using a length N spreading sequence to produce N pilots for the user. This is done for multiple users, with the pilots of the multiple users being added together for transmission.

Channel estimates that are made on the basis of such spread pilots will reflect an average of channel conditions over the group of pilot locations. Depending on whether spreading is done in the time direction or the frequency direction, the average will be over time or frequency. Several specific examples will now be given.

Figure 11:
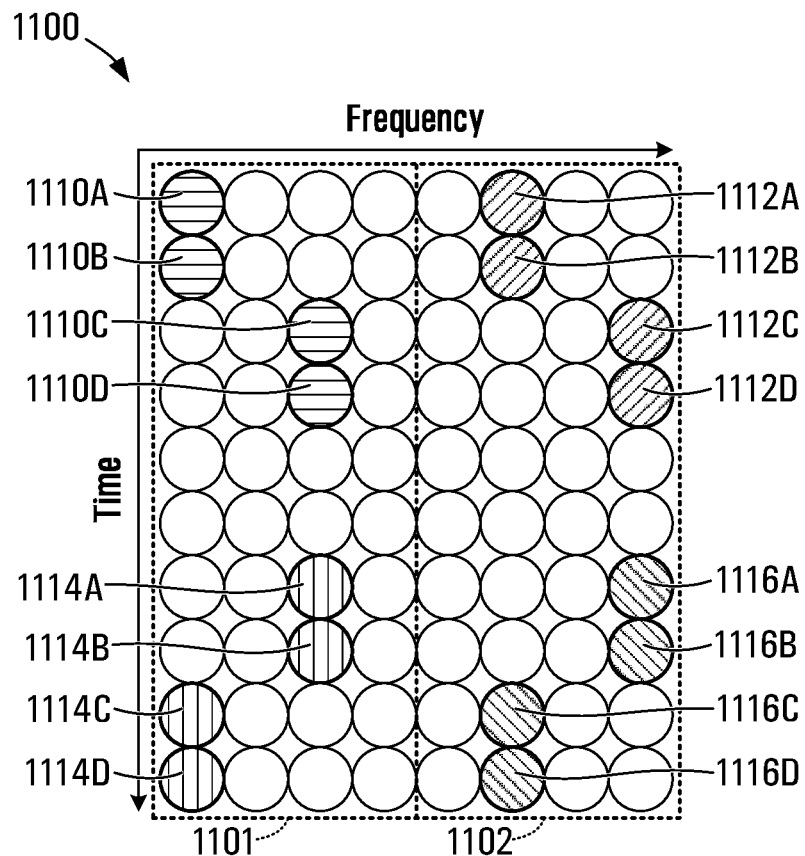
FIG. 11 is another schematic diagram of cluster pairs used for transmission of OFDM symbols using CDM for transmission of pilots for use with four different spreading codes according to an embodiment of the invention.
Figure 11:
Figure 11:
Figure 11:
Figure 11:

FIG. 11 shows an assignment of pilots in a cluster pattern 1100 in accordance with an embodiment of the invention for use with four different spreading codes. The cluster pattern 1100 includes two clusters 1101,1102 concatenated in the frequency direction, each cluster having four sub-carriers over ten OFDM symbol durations. In FIG. 11, each pilot group 1110,1112,1114,1116 includes four elements within the cluster. Each element has a location defined by a OFDM symbol duration and sub-carrier. In some embodiments pilots are spread over the four locations of each respective pilot group using a different spreading code. In some embodiments channel estimation is performed by interpolating between pilot groups in one or two dimensions.

In the illustrated example, in the cluster pattern 1100, a first pilot group 1110 is assigned to the first cluster 1101 in which a first element 1110A is located at a first OFDM symbol duration of a first sub-carrier, a second element 1110B is located at a second OFDM symbol duration of the first sub-carrier, a third element 1110C is located at a third OFDM symbol duration of a third sub-carrier and a fourth element 1110D is located at a fourth OFDM symbol duration of a fourth sub-carrier. A second pilot group 1112 is assigned to the second cluster 1102 in which a first element 1112A is located at the first OFDM symbol duration of a first sub-carrier, a second element 1112B is located at the second OFDM symbol duration of the second sub-carrier, a third element 1112C is located at the third OFDM symbol duration of a fourth sub-carrier and a fourth element 1112D is located at the fourth OFDM symbol duration of the fourth sub-carrier. A third pilot group 1114 is assigned to the first cluster 1101 in which a first element 1114A is located at a seventh OFDM symbol duration of the third sub-carrier, a second element 1114B is located at an eighth OFDM symbol duration of the third sub-carrier, a third element 1114C is located at a ninth OFDM symbol duration of the first sub-carrier and a fourth element 1114D is located at a tenth OFDM symbol duration of the first sub-carrier. A fourth pilot grouping is assigned to the second cluster 1101 in which a first element 1116A is located at the seventh OFDM symbol duration of the fourth sub-carrier, a second element 1116B is located at the eighth OFDM symbol duration of the fourth sub-carrier, a third element 1116C is located at the ninth OFDM symbol duration of the second sub-carrier and a fourth element 1116D is located at the tenth OFDM symbol duration of the second sub-carrier.

In the above-described example, with CDM pilot spreading, for a given user, four pilots are spread, one in each pilot group, each using a length four spreading sequence. The channel estimation can then be performed by interpolating between the values of the pilot groups. This is particularly useful when the channel characteristics are known to vary frequently. In another embodiment, when the channel characteristics are known to change more slowly, the four pilots for each user can be spread over one pilot location of each pilot group.

It is to be understood that the number of elements in each pilot group is implementation specific and can be greater than or less than four elements, as shown in FIG. 11. It is to be understood that the number of pilot groups is implementation specific and can be greater than or less than four elements, as shown in FIG. 11.

Furthermore, parameters such as the number of sub-carriers and OFDM symbol durations in a cluster, the use of pilots and nulls, and the location of the pilots in the cluster are all implementation specific and may vary from the values of the parameters in the examples of FIG. 11.

In some embodiments the pilot locations in a pilot group are a group of pilot locations that are contiguous in time and/or frequency. More generally, the pilot locations of a pilot group can be a collection of pilot locations each assigned to any particular sub-carrier of an OFDM symbol duration.

Figure 12:
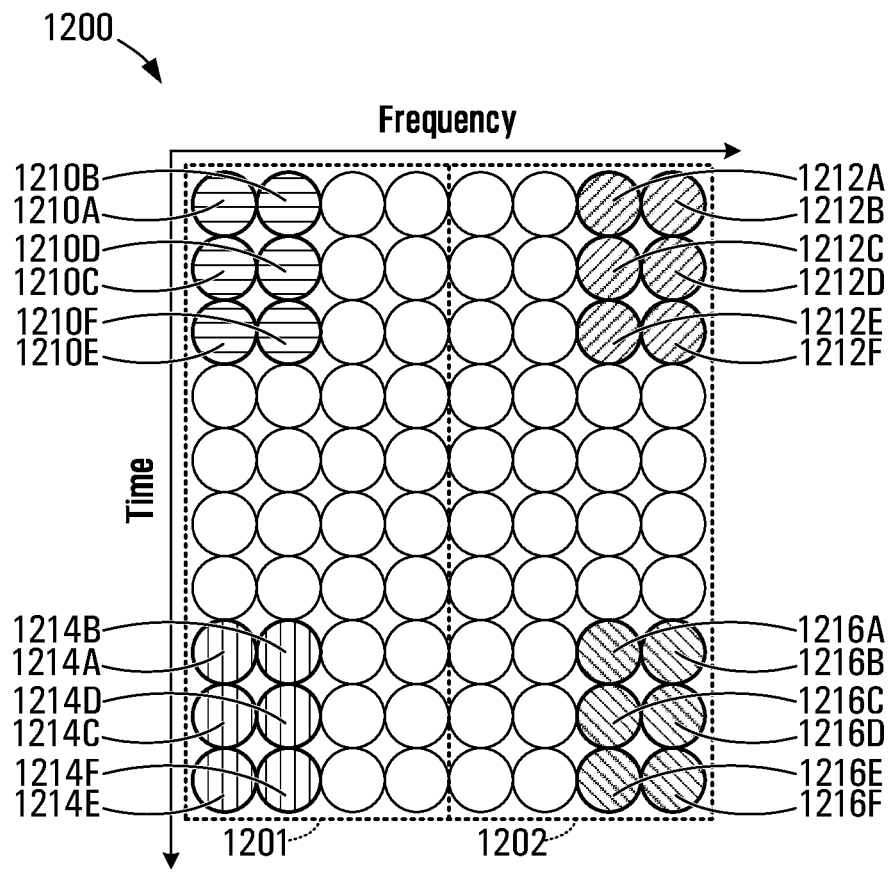
FIG. 12 is a is a schematic diagram of cluster pairs used for transmission of OFDM symbols using CDM for transmission of pilots for use with six different spreading codes according to an embodiment of the invention.

FIG. 12 shows an assignment of pilots in a cluster pattern 1200 in accordance with an embodiment of the invention for use with six spreading codes. The cluster pattern 1200 includes two clusters 1201,1202 concatenated in the frequency direction, each cluster having four sub-carriers over ten OFDM symbol durations. In FIG. 12, each pilot group 1210,1212,1214,1216 includes six elements within the cluster defined by a OFDM symbol duration and sub-carrier. The pilots are spread over the six locations using a different spreading code. In a first cluster 1201 of the cluster pattern 1200, a first pilot grouping is assigned to the first three OFDM symbol durations in each of the first two sub-carriers 1210A, 1210B, 1210C, 1210D, 1210E, 1210F. A second pilot grouping is assigned to the last three OFDM symbol durations in each of the first two sub-carriers 1214A, 1214B, 1214C, 1214D, 1214E, 1214F. In a second cluster of the cluster pair, a third pilot grouping is assigned to the first three OFDM symbol durations in each of the last two sub-carriers 1212A, 1212B, 1212C, 1212D, 1212E, 1212F. A fourth pilot grouping is assigned to the last three OFDM symbol durations in each of the last two sub-carriers 1216A, 1216B, 1216C, 1216D, 1216E, 1216F.

In a single antenna case, six users are each assigned a spreading code. Each of the six users employs its respective code to spread the pilot signal over the six locations in each of the four pilot groups 1210,1212,1214,1216. For example, a spreading code is used to spread a first pilot signal for each user over the six pilot locations in pilot group 1210, a second pilot signal for each user over the six pilot locations in pilot group 1212, a third pilot signal for each user over the six pilot locations in pilot group 1214 and a fourth pilot signal for each user over the six pilot locations in pilot group 1216.

In single user MIMO operation, the pilot pattern is employed for six antennas each assigned to one user. Each of the six antennas has a different code to spread the pilot signal over the six pilot locations of each pilot group. For example, a spreading code is used to spread a first pilot signal for each user over the six pilot locations in pilot group 1210, a second pilot signal for each user over the six pilot locations in pilot group 1212, a third pilot signal for each user over the six pilot locations in pilot group 1214 and a fourth pilot signal for each user over the six pilot locations in pilot group 1216.

In multi-user MIMO operation, the pilot pattern is employed for three users are each assigned to two antennas. In other multi-user MIMO embodiments, two users are each assigned to three antennas.

In the above-described example, with CDM pilot spreading, for a given user, four pilots are spread, one in each pilot group, each using a length four spreading sequence. The channel estimation can then be performed by interpolating between the values of the pilot groups. This is particularly useful when the channel characteristics are known to vary frequently. In another embodiment, when the channel characteristics are known to change more slowly, the four pilots for each user can be spread over one pilot location of each pilot group.

In some implementations the number of pilots locations in each pilot group is equal to or a multiple of a number of users and/or antennas. More generally, it is to be understood that the number of pilot locations in each pilot group is implementation specific and can be greater than or less than six elements as shown in FIG. 12. It is to be understood that the number of pilot groups is implementation specific and can be greater than or less than six elements as shown in FIG. 12.

Parameters such as the number of sub-carriers and OFDM symbol durations in a cluster, the use of pilots and nulls, and the location of the pilots in the cluster are all implementation specific and may vary from the values of the parameters in the examples of FIG. 12.

In some embodiments the pilot locations in a pilot group are a group of pilot locations that are contiguous in time and/or frequency. More generally, the pilot locations of a pilot group can be a collection of pilot locations each assigned to any particular sub-carrier of an OFDM symbol duration. If the pilot locations of a pilot group are localized in close proximity and the pilot groups are distributed within the cluster, spreading may be done over the pilot locations in the group and channel estimation performed by interpolating over the pilots groups in time and/or frequency directions. In another embodiment in which pilot locations of pilot groups are localized in close proximity spreading may be done over a pilot location in each pilot group and channel estimation is an average of the pilot location values. Examples are shown in FIGS. 11 and 12.

If the pilot locations of a pilot group are distributed within the cluster, spreading may be done over a pilot location in each pilot group to obtain a logical localized set of pilot locations and channel estimation is performed by interpolating over the logical localized sets of pilot locations in time and/or frequency directions. In another embodiment in which pilot locations of a pilot group are distributed within the cluster spreading may be done over a pilot location in each pilot group and channel estimation is an average of the pilot location values.

While FIGS. 9 and 10 were not described as having spreading over the pilot groups, it is to be understood that those cluster patterns could employ CDM techniques to spread pilots across all pilot locations of each pilot group or across a pilot location of each pilot group and perform channel estimation as described above.

A disadvantage of an increased number of pilots in a cluster is an increase in the ratio of overhead to payload.

In some embodiments of the present invention systems and methods support transformed OFDM (T-OFDM) transmissions. T-OFDM is described in further detail in PCT Patent Application No. 2006/0100523 filed Mar. 30, 2006, which is assigned to the same assignee of the present application and hereby incorporated in its entirety.

In some embodiments of the present invention systems and methods support single user single, single antenna OFDM transmissions.

In some embodiments of the present invention systems and methods support single user and multiple user MIMO and collaborative MIMO OFDM transmissions.

Figure 1:
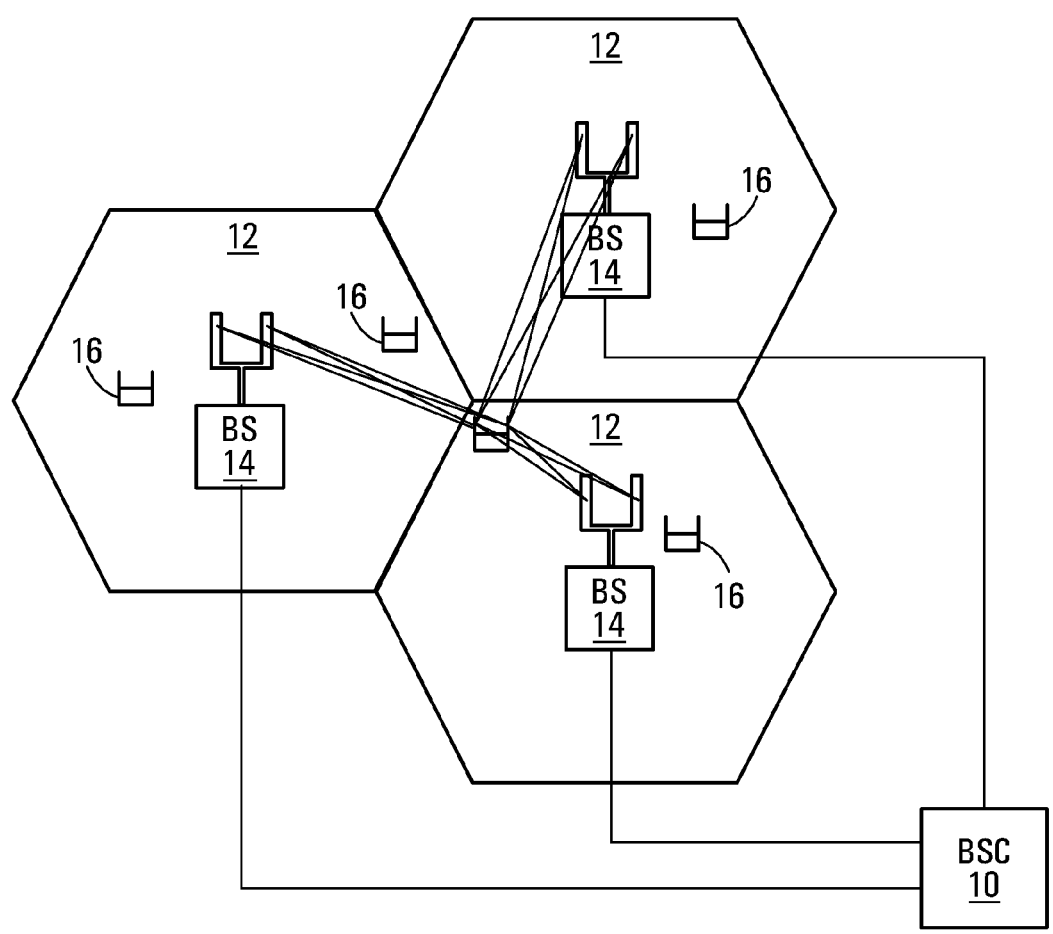
FIG. 1 is a block diagram of a cellular communication system.

For the purposes of providing context for embodiments of the invention for use in a communication system, FIG. 1 shows a base station controller (BSC) 10 which controls wireless communications within multiple cells 12, which cells are served by corresponding base stations (BS) 14. In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications.

Figure 2:
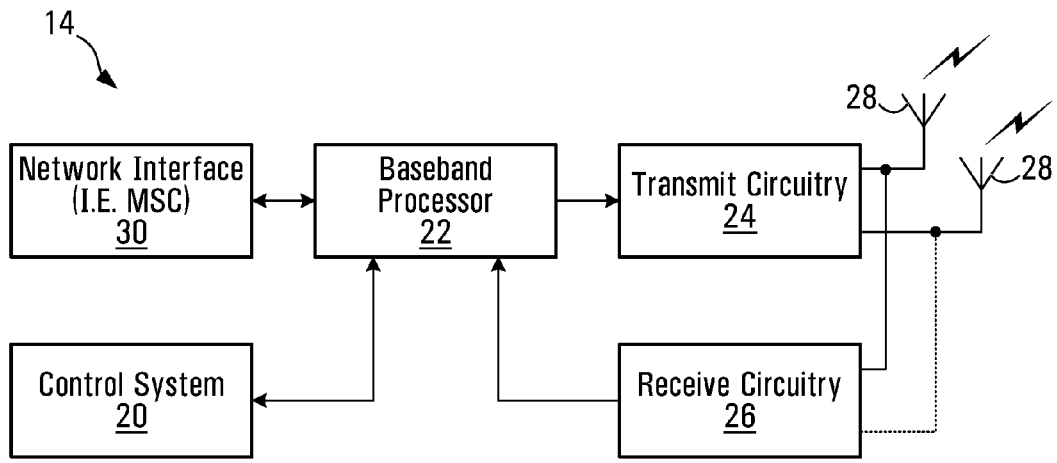
FIG. 2 is a block diagram of an example base station that might be used to implement some embodiments of the present invention.

A high level overview of the mobile terminals 16 and base stations 14 upon which aspects of the present invention are implemented is provided prior to delving into the structural and functional details of the preferred embodiments. With reference to FIG. 2, a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 1). A low noise amplifier and a filter (not shown) may cooperate to amplify and remove broadband interference from the signal for processing. Down-conversion and digitization circuitry (not shown) will then down-convert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Various modulation and processing techniques available to those skilled in the art are used for signal transmission between the base station and the mobile terminal.

Figure 3:
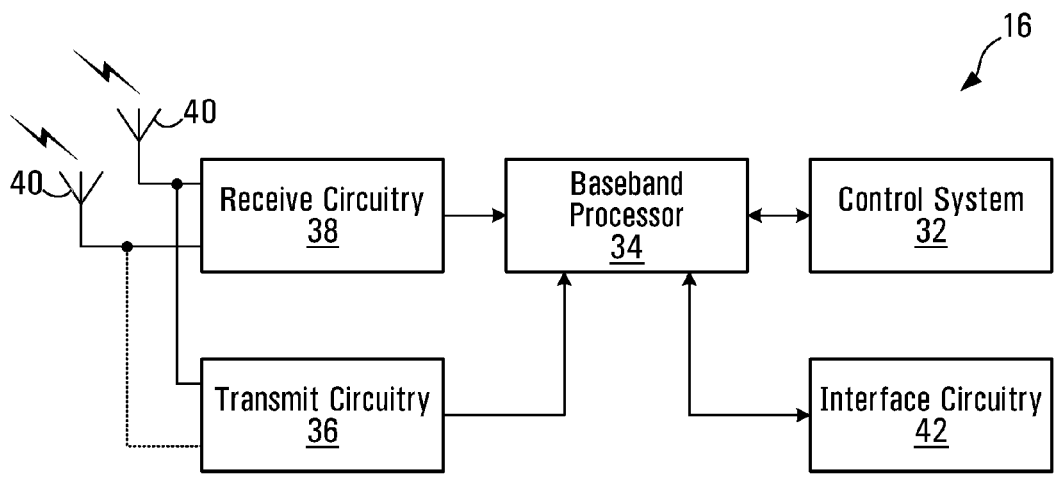
FIG. 3 is a block diagram of an example wireless terminal that might be used to implement some embodiments of the present invention.

With reference to FIG. 3, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. A low noise amplifier and a filter (not shown) may cooperate to amplify and remove broadband interference from the signal for processing. Down-conversion and digitization circuitry (not shown) will then down-convert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are used for signal transmission between the mobile terminal and the base station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28, and each mobile terminal 16 is equipped with "m" receive antennas 40. Notably, the respective antennas can be used for reception and transmission using appropriate duplexers or switches and are so labeled only for clarity.

Figure 4:
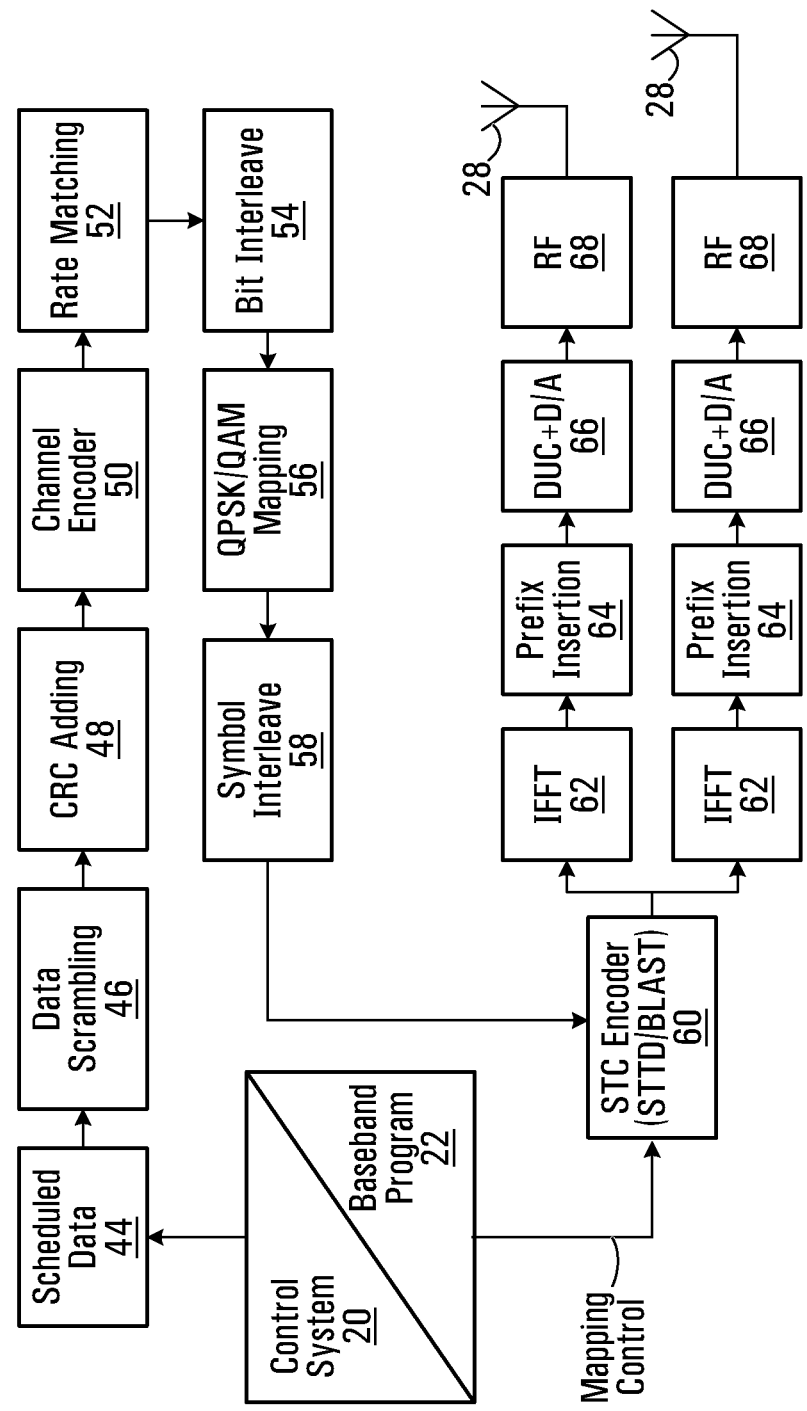
FIG. 4 is a block diagram of a logical breakdown of an example OFDM transmitter architecture that might be used to implement some embodiments of the present invention.

With reference to FIG. 4, a logical OFDM transmission architecture will be described. Initially, the base station controller 10 will send data to be transmitted to various mobile terminals 16 to the base station 14. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 2 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 5:
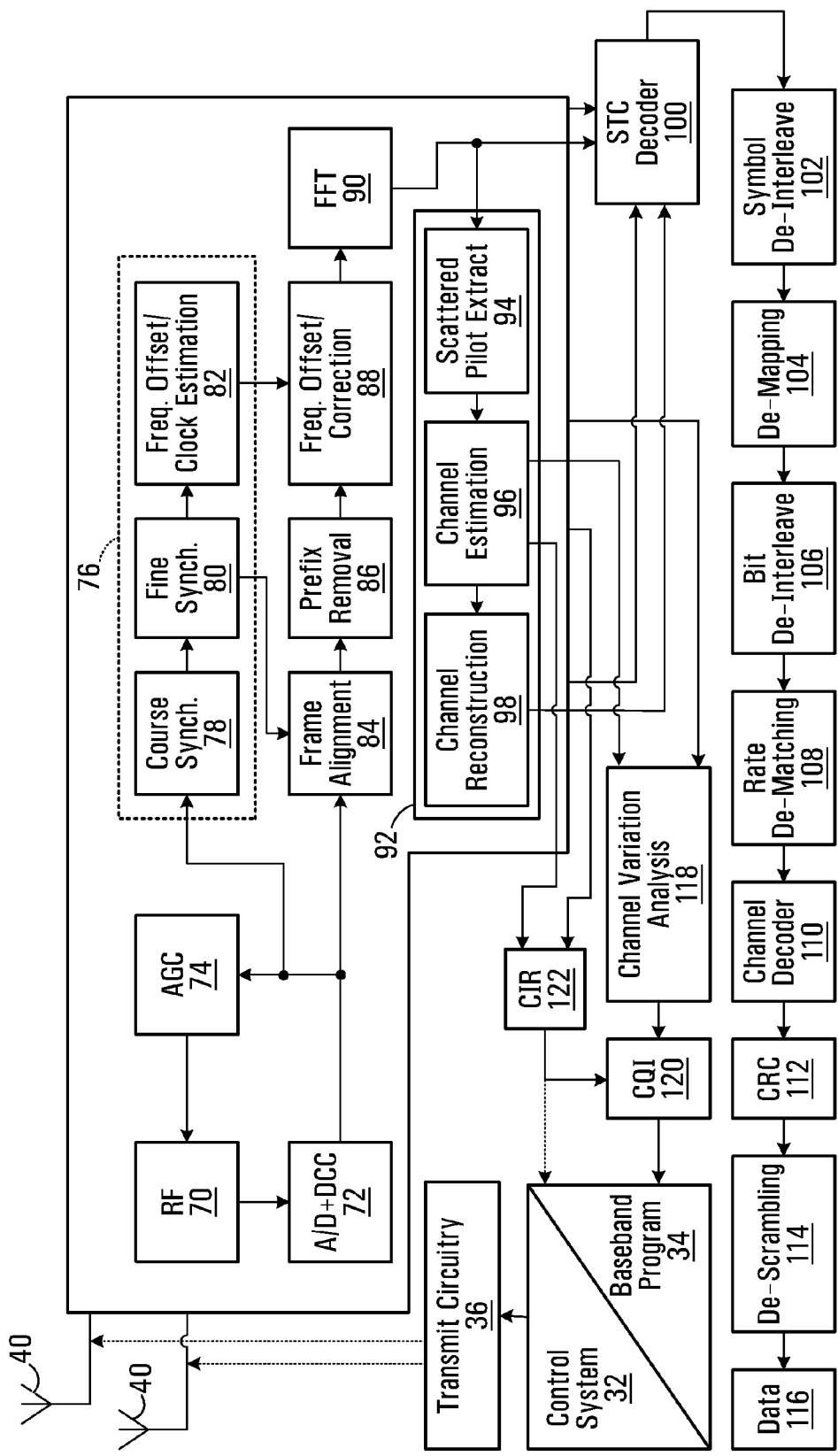
FIG. 5 is a block diagram of a logical breakdown of an example OFDM receiver architecture that might be used to implement some embodiments of the present invention.

Reference is now made to FIG. 5 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and down-converts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an autocorrelation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Examples of scattering of pilot symbols among available sub-carriers over a given time and frequency plot in an OFDM environment are found in PCT Patent Application No. PCT/CA2005/000387 filed Mar. 15, 2005 assigned to the same assignee of the present application. Continuing with FIG. 5, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. The channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

In some embodiments a receiver is adapted to receive a signal transmitted in accordance with embodiments of the invention described above in which pilots and/or data are spread using CDM spreading techniques.

In some embodiments the receiver is further adapted to extract pilots from the signal and to perform channel estimation by interpolating in time and/or frequency directions. In some embodiments the receiver is further adapted to perform channel estimation by averaging pilots. In some embodiments the receiver is further adapted to despread at least one of pilots and data using at least one CDM spreading code assigned to the receiver.

FIGS. 1 to 5 each provide a specific example of a communication system or elements of a communication system that could be used to implement embodiments of the invention. It is to be understood that embodiments of the invention can be implemented with communications systems having architectures that are different than the specific example, but that operate in a manner consistent with the implementation of the embodiments as described herein.

Numerous modifications and variations of the present invention are possible in light of the above teachings. It is therefore to be understood that within the scope of the appended claims, the invention may be practiced otherwise than as specifically described herein.

What is claimed is:

1. An Orthogonal Frequency Division Multiplexing (OFDM) receiver, comprising:
 a first antenna;
 at least one additional antenna; and
 receive logic adapted to receive a signal, wherein the signal includes:
  for reception by the first antenna, a first plurality of OFDM symbols containing a plurality of clusters, each cluster including a plurality of sub-carriers over a plurality of OFDM symbol durations and each cluster having spread within it using code division multiplexing (CDM) at least one of data and pilots, and for reception by the at least one additional antenna, an additional plurality of OFDM symbols containing an additional plurality of clusters, each additional cluster comprising an additional plurality of sub-carriers over an additional plurality of OFDM symbol durations and each additional cluster having spread within it using an additional CDM code at least one of data and pilots.

2. The OFDM receiver of claim 1, wherein the receive logic is further adapted to extract the pilots from the signal.

3. The OFDM receiver of claim 2, wherein the receive logic is further adapted to perform channel estimation by interpolation in at least one of a time and frequency direction.

4. The OFDM receiver of claim 2, wherein the receive logic is further adapted to perform channel estimation by averaging the pilots.

5. The OFDM receiver of claim 1, wherein the receive logic is further adapted to despread the at least one of data and pilots using at least one CDM code associated with the signal.

* * * * *